(12) United States Patent
Li et al.

(10) Patent No.: US 10,701,691 B2
(45) Date of Patent: Jun. 30, 2020

(54) DATA TRANSMISSION METHOD AND DEVICE

(71) Applicant: Samsung Electronics Co., Ltd., Gyeonggi-do (KR)

(72) Inventors: Yingyang Li, Beijing (CN); Shichang Zhang, Beijing (CN); Yi Wang, Beijing (CN)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/308,715

(22) PCT Filed: Jul. 25, 2017

(86) PCT No.: PCT/KR2017/008005
§ 371 (c)(1),
(2) Date: Dec. 10, 2018

(87) PCT Pub. No.: WO2018/021803
PCT Pub. Date: Feb. 1, 2018

(65) Prior Publication Data
US 2019/0313405 A1 Oct. 10, 2019

(30) Foreign Application Priority Data

Jul. 29, 2016 (CN) .......................... 2016 1 0617498
Aug. 23, 2016 (CN) .......................... 2016 1 0710808
(Continued)

(51) Int. Cl.
*H04W 72/04* (2009.01)
*H04W 24/08* (2009.01)
*H04W 72/12* (2009.01)

(52) U.S. Cl.
CPC ....... *H04W 72/0446* (2013.01); *H04W 24/08* (2013.01); *H04W 72/1231* (2013.01)

(58) Field of Classification Search
CPC ............. H04W 24/08; H04W 72/0446; H04W 72/1231
See application file for complete search history.

(56) References Cited

U.S. PATENT DOCUMENTS 8,463,313 B2 * 6/2013 Love ..................... H04L 1/1845
455/522
10,425,959 B2 * 9/2019 Li ....................... H04W 52/383
(Continued)

FOREIGN PATENT DOCUMENTS

WO  WO 2015065632  5/2015
WO  WO 2016032184  3/2016

OTHER PUBLICATIONS

PCT/ISA/210 Search Report issued on PCT/KR2017/008005 (pp. 12).
PCT/ISA/237 Written Opinion issued on PCT/KR2017/008005 (pp. 5).

*Primary Examiner* — Kashif Siddiqui
(74) *Attorney, Agent, or Firm* — The Farrell Law Firm, P.C.

(57) ABSTRACT

The present disclosure relates to a pre-5$^{th}$-Generation (5G) or 5G communication system to be provided for supporting higher data rates beyond 4$^{th}$-Generation (4G) communication system such as Long Term Evolution (LTE). The present disclosure may be applied to intelligent services based on the 5G communication technology and an Internet of Things (IoT)-related technology, such as smart home, smart building, smart city, smart car, connected car, health care, digital education, smart retail, security and safety services. The present application provides a data transmission method. A first device senses scheduling assignment (SA) and received power of another device, and/or senses a total received energy of all of subframes/sub-bands of the first device. The first device selects or re-selects resources
(Continued)

---

401 — device A senses SA and received power of another device, and/or, sense the total received energy of subframes/sub-bands of the first device 402 — device A performs resource selection/re-selection based on the above sensing result, and performs data transmission according to the sensing result. The first device transmits data using the resources. The present application also provides a data transmission device. The data transmission method and device can select optimal resources for data transmission to avoid impacts of collisions on data transmission, and can adjust system running state in case of congestion to improve system performance as much as possible.

10 Claims, 10 Drawing Sheets

(30) Foreign Application Priority Data

| | | |
|---|---|---|
| Sep. 27, 2016 | (CN) | 2016 1 0857252 |
| Oct. 8, 2016 | (CN) | 2016 1 0879464 |
| Oct. 25, 2016 | (CN) | 2016 1 0934494 |
| May 4, 2017 | (CN) | 2017 1 0309427 |

(56) References Cited

U.S. PATENT DOCUMENTS

| | | | |
|---|---|---|---|
| 2014/0269605 A1 | 9/2014 | Pecen et al. | |
| 2015/0215903 A1* | 7/2015 | Zhao | H04W 72/082 370/329 |
| 2015/0334760 A1 | 11/2015 | Sartori et al. | |
| 2017/0027011 A1* | 1/2017 | Chae | H04W 76/14 |
| 2017/0150501 A1* | 5/2017 | Park | H04L 1/1861 |
| 2017/0303215 A1* | 10/2017 | Kim | H04W 52/48 |

* cited by examiner

[Fig. 1]
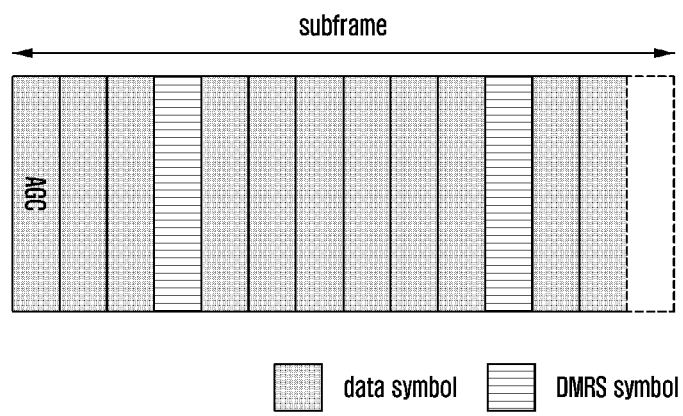
[Fig. 2]
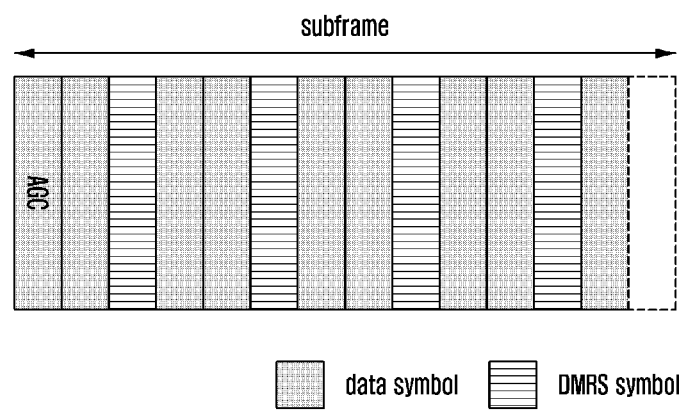

[Fig. 3]
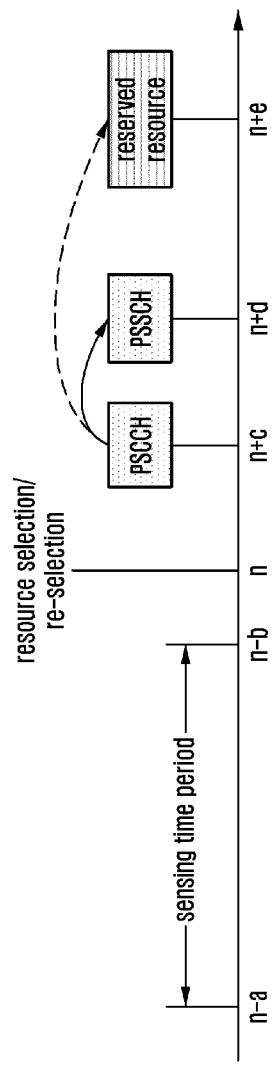
[Fig. 4]
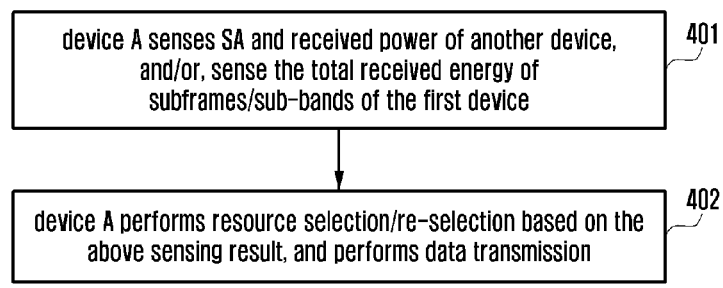

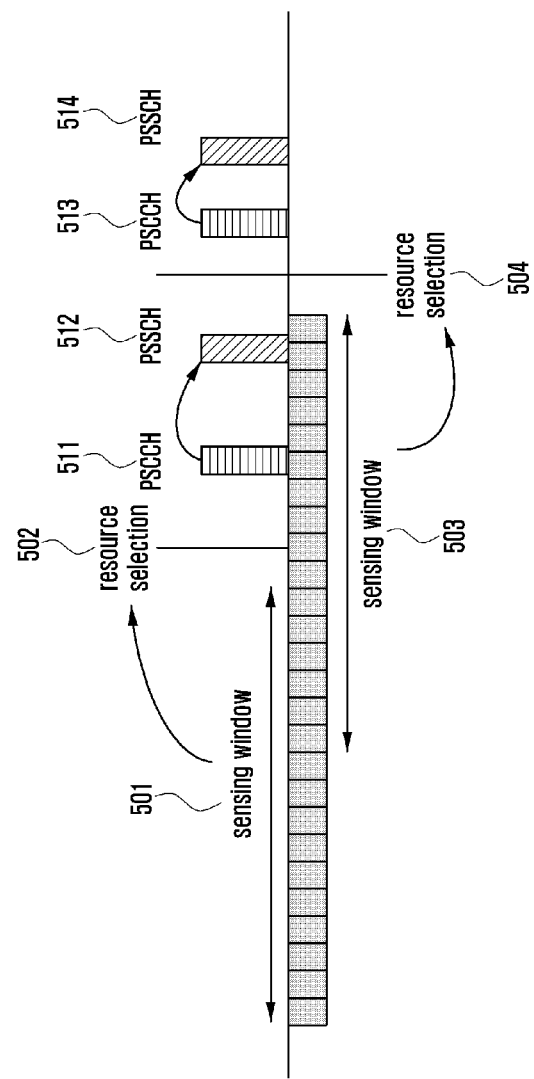
[Fig. 5]

[Fig. 6]
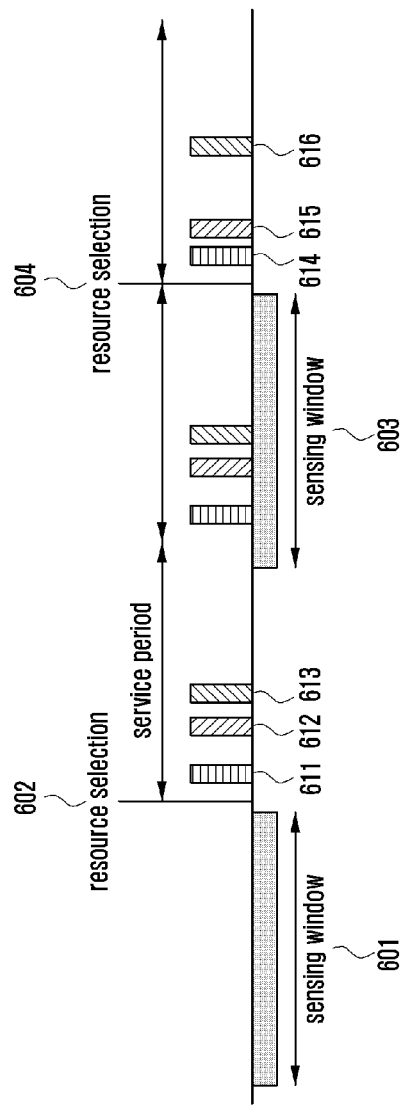
[Fig. 7]
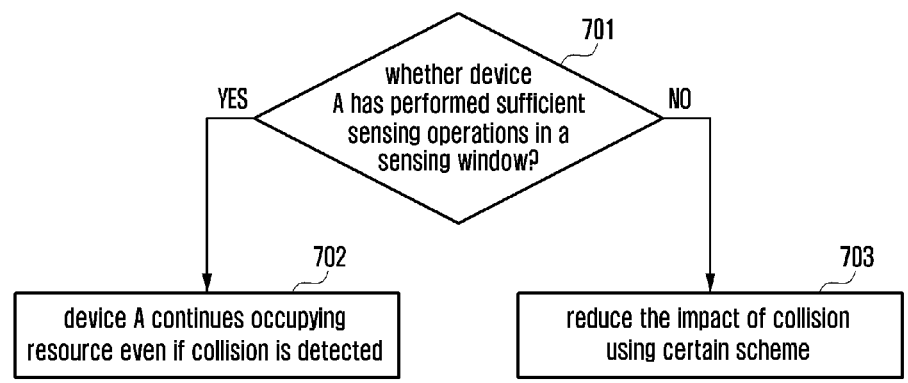

[Fig. 8]
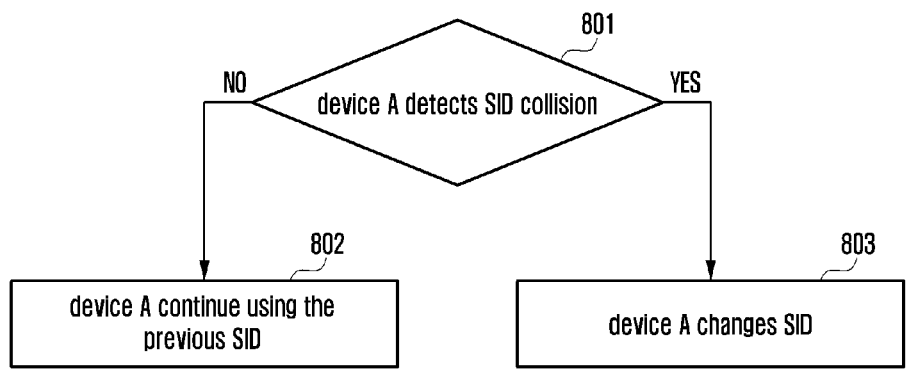
[Fig. 9]
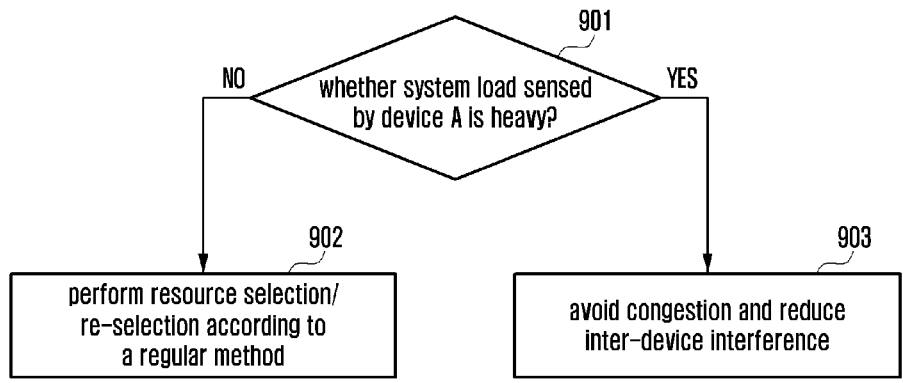

[Fig. 10]
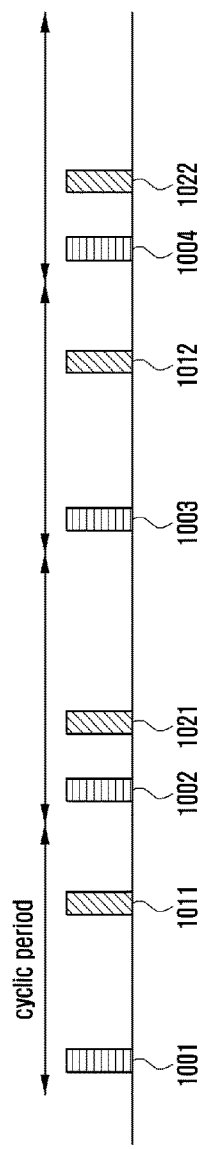
[Fig. 11]
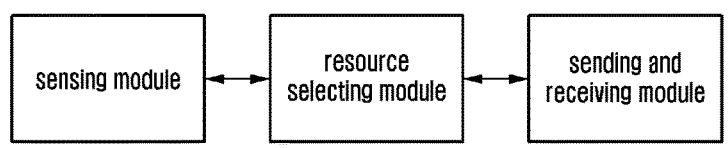
[Fig. 12]
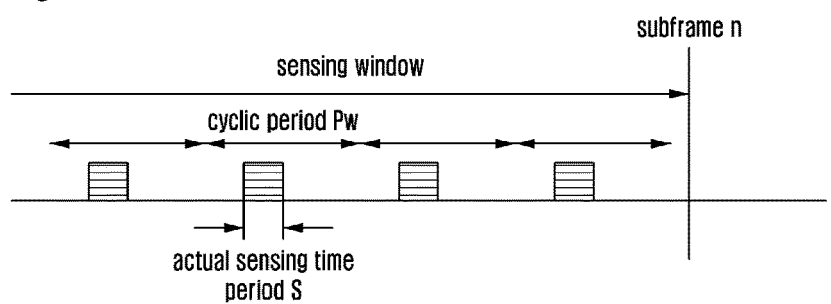

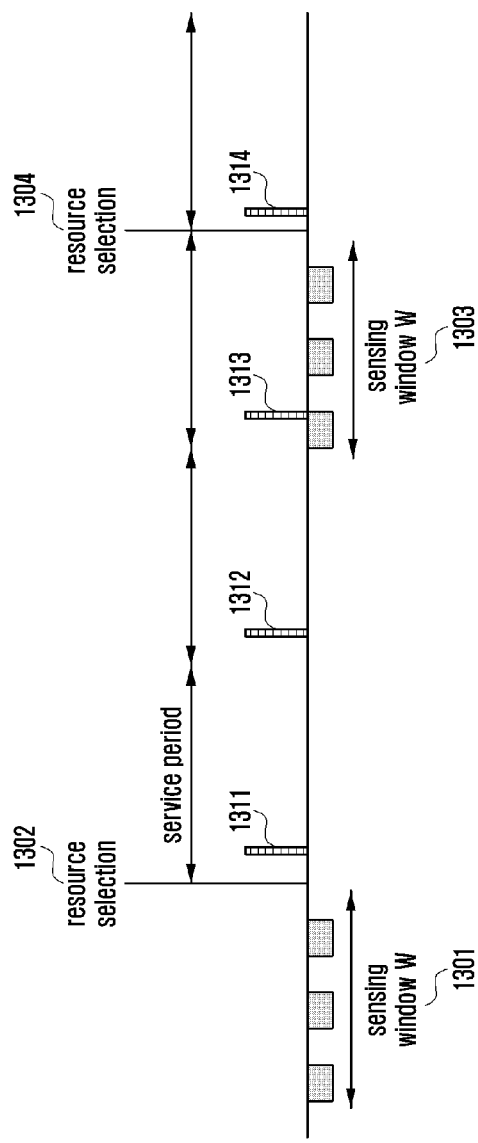
[Fig. 13]

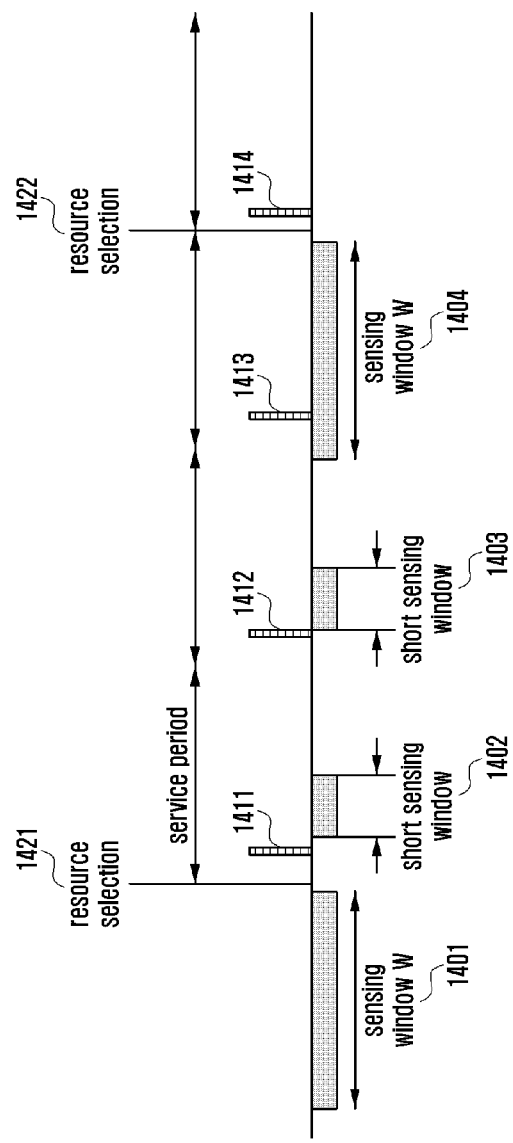

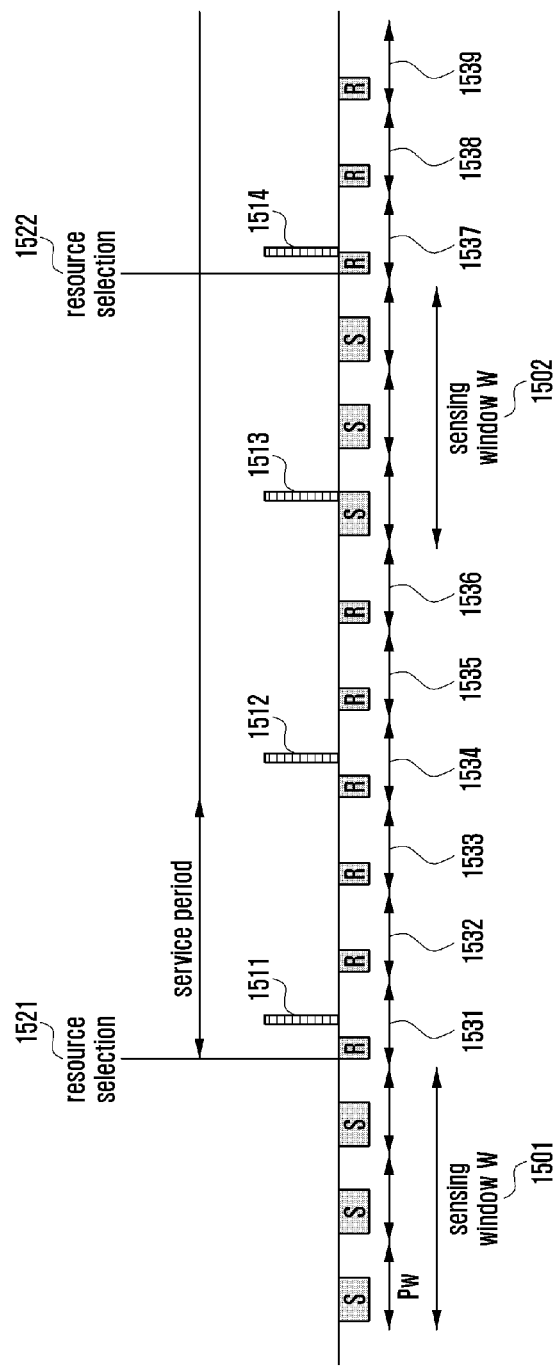
[Fig. 15]

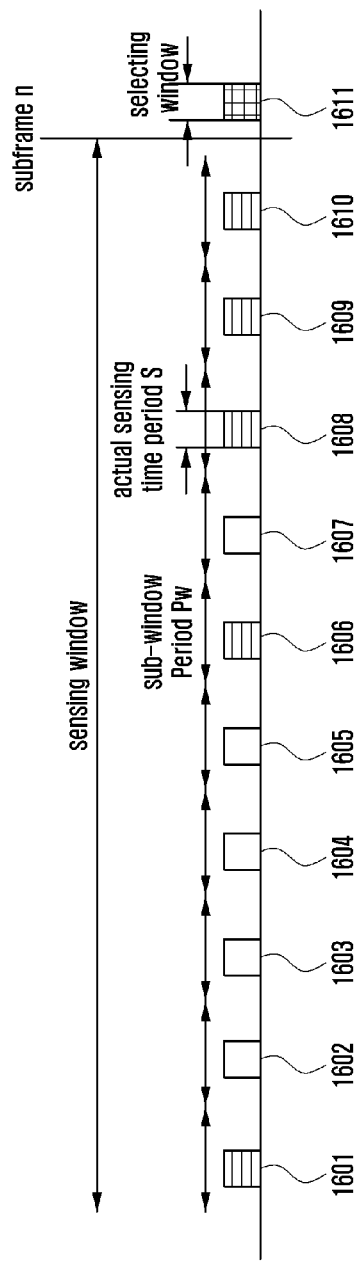
[Fig. 16]

DATA TRANSMISSION METHOD AND DEVICE

PRIORITY

This application is a National Phase Entry of PCT International Application No. PCT/KR2017/008005 which was filed on Jul. 25, 2017, and claims priority to Chinese Patent Application Nos. 201610617498.5, 201610710808.5, 201610857252.5, 201610879464.3, 201610934494.X, and 201710309427.3, which were filed on Jul. 29, 2016, Aug. 23, 2016, Sep. 27, 2016, Oct. 8, 2016, Oct. 25, 2016, and May 4, 2017, respectively, the content of each of which is incorporated herein by reference.

TECHNICAL FIELD

The present application relates to wireless communication systems, and particularly, to a data transmission method and device with resource selection or re-selection in a LTE D2D/V2X system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

At present, device to device (D2D) techniques have been accepted by the third generation partnership project (3GPP) for the great potential value of D2D in fields such as public safety and civil communications. 3GPP has standardized some functions of D2D, including in coverage (IC) mutual discovery of D2D terminals, broadcast communications between D2D terminals under IC scenarios, partial coverage (PC) scenarios and out of coverage (OC) scenarios.

Current 3GPP Rel-12 standards define two modes for D2D broadcast communications which are briefly referred to as Mode 1 and Mode 2.

The Mode 1 requires a UE transmitting D2D broadcast communication information to be in coverage of a cellular network, i.e., an in coverage UE (ICUE). A UE obtains configuration information of a physical sidelink control channel (PSCCH) resource pool of Mode 1 from received system broadcast signaling transmitted by an eNB. The configuration information includes a periodicity of PSCCH, the location of a subframe in which PSCCH is transmitted in each periodicity, and the location of a physical resource block (PRB) in which PSCCH is transmitted in each subframe. When a UE with Mode 1 broadcast communication capabilities has data to be transmitted, the UE may request dedicated Mode 1 communication resources from an eNB using a specific buffer status report (BSR). Then, the UE may check sidelink grant of the eNB before each PSCCH periodicity starts to obtain the resource location for transmitting PSCCH and physical sidelink shared channel (PSSCH) in the PSCCH periodicity. In Mode 1, resource collision between different UEs can be avoided thanks to centralized control of eNBs.

A UE transmitting D2D broadcast communication information under Mode 2 may be an ICUE, or a UE out of coverage of the cellular network, i.e., an out of coverage UE (OCUE). An ICUE may obtain configuration information of a PSCCH resource pool of Mode 2 and configuration information of an associated PSSCH resource pool by receiving system broadcast signaling of an eNB. The configuration information on PSSCH resource pool includes: the location of a subframe in which PSSCH is transmitted in an associated PSSCH periodicity, the location of a PRB in which PSSCH is transmitted in each subframe. In each PSCCH periodicity, transmit resources of PSCCH and associated PSSCH may be randomly selected. An OCUE may determine configuration information of a PSCCH resource pool of Mode 2 and an associated PSSCH resource pool using pre-configured information, and may select resources in the same manner with an ICUE. In PC scenarios, configuration of the Mode 2 resource pool pre-configured for an OCUE is related with carrier frequency of a cell serving an ICUE participating in D2D broadcast communications, system bandwidth and/or TDD configurations.

In the above two D2D broadcast communication modes, a PSCCH resource pool and a PSSCH resource pool are associated with each other in a one-to-one manner, or a PSCCH resource pool and a PSSCH resource are associated with each other in a one-to-one manner. Within each PSCCH periodicity, a PSCCH resource pool locates prior to its associated PSSCH resource pool or PSSCH resource, and the resources of the PSCCH resource pool and the resources of the associated PSSCH resource pool or the PSSCH resource do not have intersection. In addition, D2D terminals always work under half-duplex mode, which results in two terminals incapable of receiving signals from each other when they transmit signals simultaneously. In Rel-12, in each PSCCH periodicity, each PSCCH is transmitted two times, and each PSCCH transmission occupies one PRB. The above restriction resulted from the half-duplex can be avoided using resource hopping. For example, for PSCCHs whose first transmission are in the same subframe, the locations of subframes serving as the resources of the second transmission may shift, and the extent of the shift is related with the spectrum location of the resources for the first transmission. As such, PSCCHs first transmitted in the same subframe may be re-transmitted in different subframe locations. In addition, two transmissions may enhance reception reliability of PSCCH.

FIG. 1 is a schematic diagram illustrating the structure of an uplink subframe in a 3GPP LTE system. Among 14 OFDM symbols in a subframe, two OFDM symbols, whose indices are 3 and 10 respectively, are for transmitting de-modulation reference signal (DMRS). The last OFDM symbol in a subframe is designed for providing time for a device to switch between sending and receiving and for avoiding two successive subframes from overlapping with each other due to problems such as propagation delay, time advance (TA), or the like, thus is not used for transmitting data. The other symbols are for transmitting uplink data. The first OFDM symbol in the subframe can also be used for transmitting data, and in practice may be used for automatic gain control (AGC).

Since 3GPP D2D communication mainly targets low-data rate terminals and delay-sensitive and reliability-insensitive V2X traffic, implemented D2D functions is far from satisfying user requirements. It has become wide consensus of various communication terminal manufacturers and communication network device manufacturers to enhance D2D function framework in subsequent 3GPP versions. One of functions to be first standardized is vehicle to vehicle/pedestrian/infrastructure/network (V2X) information exchange based on current D2D broadcast communications mechanism, which enables low-delay high-reliability direct communication between high-speed devices, between high-speed device and low-speed device, between high-speed device and immobile device.

As shown in FIG. 1, the uplink subframe can satisfy demands of main application scenarios of D2D, but cannot satisfy requirements for performance in a typical V2X scenario. For example, V2X communication requires a maximum relative moving speed of 500 km/h of UE, a maximum carrier frequency of 6 GHz. The high speed and high carrier frequency, however, may introduce Doppler frequency shift which may result in severe inter-subcarrier interference. In addition, taking into account the influences of differences in timing and frequency between eNB and UE, the DMRS structure as shown in FIG. 1 cannot satisfy the performance requirements. In current discussions of standardization conferences, an important solution is as shown in FIG. 2, i.e., transmitting DMRS in 4 OFDM symbols whose indices are 2, 5, 8, 11, to increase the time density of DMRS thus provide better performance.

In 3GPP D2D systems, the DMRS sequence of PSCCH is fixed, i.e., all of transmitting terminals use the same DMRS sequence. Particularly, according to the method of generating DMRS in LTE, the root sequence of DMRS is obtained by using a cell identity (PCID) of 510, a DMRS cyclic shift (CS) of 0 and an orthogonal cover code (OCC) of [1 1]. The scrambling sequence of scheduling information transmitted in PSCCH is also fixed, i.e., all of transmitting terminals use the same scrambling sequence. Specifically, the method of generating an LTE scrambling code is: setting PCID to be 510 and other information, e.g., time slot index, UE identity, etc., to be 0. According to the method, when two devices transmit scheduling assignment (SA) in the same PRB, the DMRSs of the two devices overlap with each other completely, which is equivalent to only one DMRS sequence at the receiving end. The density of terminals in V2X communications is far more larger than in D2D communications, thus it is highly possible that two or multiple devices transmit SA and/or data using the same resource, i.e., there are more SA resource collisions. In addition, besides the collisions, even if two transmitting devices transmit data on different frequencies within the same subframe, in-band leakage interference may also reduce reception performances considering the influence of near-far effect. In other words, for a receiving terminal, the energy leaked by a nearby device to neighboring PRBs may be at the same level with, or even stronger than, the energy of signals from far-away devices in the neighboring PRBs. Since the terminal density in V2X communications is far more larger than in D2D communications, the above in-band leakage interference may be more severe.

According to current discussions of standardized conferences, a solution is solving the above collision problem and in-band leakage problem by sensing. A basis assumption is that devices occupies resources based on semi-persistent scheduling (SPS), i.e., resources occupied by a device are periodic within a time period. As shown in FIG. 3, denoting the time spot when a device selects PSCCH/PSSCH resources is subframe n, the device first senses resources in a resource pool of the device in a time period from subframe n−a to subframe n−b, and judges which time-frequency resources are being occupied and which time-frequency resources are available. Then the device performs selection or re-selection (shortened as selection/re-selection hereinafter) of PSCCH/PSSCH resources, denoted that PSCCH is transmitted in subframe n+c, PSSCH is transmitted in subframe n+d, and reserved resources are in subframe n+e. After that, the device transmits PSCCH in subframe n+c, PSSCH in subframe n+d, and the next data in reserved resources in subframe n+e. The above sensing of resources in the resource pool by the device may be performed in the following two manners. One manner is decoding PSCCH to obtain detailed information about channel occupancy of other devices so as to measure received power of another device. The other manner is sensing the energy in the PSSCH resource pool. The former manner can obtain precise information about channel occupancy and reservation, but the sensing based on PSCCH may fail if the PSCCH is not received correctly, e.g., PSCCHs of multiple devices collide with each other. The latter manner is judging whether resources are being occupied based on the amount of sensed energy, so as to try to avoid occupied resources. However, V2X traffic are not strictly periodic, messages from different devices may have different cyclic periods within a time period, this may affect the prediction performances of the energy-based sensing manner. In fact, the sensing based on PSCCH and the sensing based on energy may be used collectively to avoid collision and interference and improve performances as much as possible.

DISCLOSURE OF INVENTION

Technical Problem

The present application provides a data transmission method and device which can select optimal resources for data transmission, so as to better avoid collisions and interference between devices.

Solution to Problem

To attain the above objective, various examples provide the following technical mechanisms.

The present application provides a data transmission method which includes:

sensing, by a first device, scheduling assignment (SA) and received power of another device, and/or a total of received energy of all of subframes/sub-bands of the first device;

selecting or re-selecting, by the first device, resources according to a sensing result; and transmitting, by the first device, data using the resources.

Preferably, selecting or re-selecting resources includes:

selecting K resources as the resources occupied by the first device; wherein K is larger than or equal to 1, the K resources have the same or different or almost the same occupancy cyclic period.

Preferably, selecting K resources as the resources occupied by the first device includes:

determining K data channel resources according to a sensing result obtained from a sensing window corresponding to subframe n; or determining a sensing window corresponding to each resource of the K resources, and determining a data channel resource corresponding to each sensing window according to a sensing result of each sensing window.

Preferably, selecting K resources as the resources occupied by the first device includes:

performing the selecting or re-selecting for all of the K resources collectively; or performing a selecting or re-selecting process for each of the resources; or assigning the K resources into a plurality of groups, and performing a selecting or re-selecting process for each of the groups.

Preferably, selecting or re-selecting by the first device resources according to a sensing result includes:

performing the sensing only in a sensing window before the timing of resource re-selection, and performing the selecting or re-selecting according to a sensing result; or sensing subframes within a sensing window before a prospective resource re-selection time point so that the proportion of subframes sensed within the sensing window is larger than the proportion of subframes sensed before the sensing window.

Preferably, when a subframe in a selecting window has an index of m, the first device senses a subframe whose index is m−$P_q$, $P_q \in Q$ or $P_q \in Q$ and $P_q \geq P_w$, Q is a set of resource reserve cyclic periods, $P_w$ is a reference value of reservation interval; or the first device senses a subframe whose index is m−p, p∈Q', Q' is a superset which includes the set Q, or Q' is a superset which includes all of elements $P_q$ of Q, and $P_q \geq P_w$.

Preferably, when there is a j which makes y+j·$P_A$=m+$P_q$, wherein $P_q \in Q$, m is an index of a subframe on which no sensing operation is performed in the sensing window, a single-subframe resource $R_{x,y}$ is unavailable to the first device; or when there is a j which makes y+j·$P_A$=m+$P_q$, $P_q \in Q$ and $P_q \geq P_w$, the single-subframe resource $R_{x,y}$ is unavailable to the first device; $R_{x,y}$ is on subframe y and includes one or multiple consecutive sub-bands starting from sub-band x, $P_q$ is a resource reserve cyclic period, Q is a set of resource reserve cyclic periods, $P_w$ is a reference value of reservation interval, j is an integer smaller than C but not smaller than 0, C is the number of periods in which device A is to reserve resource according to the cyclic period; $P_A$; or when there is a j which makes y+j·$P_A$=m+$P_q$, wherein $P_q \in Q$, m is an index of a subframe on which no sensing operation is performed in a sub window of a reservation interval $P_q$ which is available for data transmission, the single-subframe resource $R_{x,y}$ is unavailable to the first device; or when there is a j which makes y+j·$P_A$=m+$P_q$, $P_q \in Q$ and $P_q \geq P_w$, the single-subframe resource $R_{x,y}$ is unavailable to the first device; or when there is a j which makes y+j·$P_A$=m+$P_q$, wherein $P_q \in Q$, m is an index of a subframe on which no sensing operation is performed in a sub window on which a sensing operation is performed, the single-subframe resource $R_{x,y}$ is unavailable to the first device; or when there is a j which makes y+j·$P_A$=m+$P_q$, $P_q \in Q$ and $P_q \geq P_w$, the single-subframe resource $R_{x,y}$ is unavailable to the first device; or no processing is applied to a subframe on which no sensing operation is performed.

Preferably, for a set Q', when an index of a subframe in the selecting window is m, and device A performs no sensing operation on a subframe whose index is m−p, p∉Q', there does not exist a j which makes y+j·$P_A$=m−p+$P_q$ for a single-subframe resource $R_{x,y}$, wherein $P_q \in Q$, j is an integer smaller than C but not smaller than 0, C is the number of periods in which device A is to reserve resource according to the cyclic period $P_A$.

Preferably, selecting or re-selecting by the first device resources according to a sensing result includes:

when resource selection or re-selection is performed within subframe n and the first device does not perform the sensing of SA and received power and the sensing of the total received energy of all of subframes/sub-bands of the first device before the subframe n, performing, by the first device, resource selection or re-selection and reducing the time of repetitively occupying the resources; and/or when resource selection or re-selection is performed within subframe n and the first device does not perform the sensing of SA and received power and the sensing of the total received energy of all of subframes/sub-bands of the first device before the subframe n, performing, by the first device, resource re-selection after detecting resource collision.

Preferably, performing by the first device resource re-selection after detecting resource collision include any one of:

after detecting resource collision, performing, by the first device, the resource re-selection after performing data transmission of a cyclic period;

after detecting resource collision, performing, by the first device, the resource re-selection after performing data transmission of a cyclic period and indicating resource release in at least one SA;

after detecting resource collision, performing, by the first device, the resource re-selection after indicating resource release in all of SAs within a cyclic period and after the cyclic period ends;

performing, by the first device, resource selection or re-selection respectively for each resource, and performing resource re-selection for a resource in which resource collision is detected;

performing, by the first device, resource selection or re-selection respectively for each resource, and performing resource re-selection after transmitting SA indicating resource release in response to detection of resource collision;

dividing, by the first device, the resources into groups, performing resource selection or re-selection for each of the groups of resources, and performing resource re-selection only for a group of resources in which collision is detected after the collision is detected.

Preferably, after sensing SA of other devices, the method may also include:

sensing whether a source identity (SID) of the first device is being used by another device according to the SA of other devices; if the SID of the first device is being used by another device, re-selecting, by the first device, an SID or reporting an event of SID collision to an eNB requesting the eNB to configure a new SID.

Preferably, sensing the SID of the first device is being used by another device according to the SA of other devices includes:

checking, by the first device, whether the SID is being used by another device after transmission of each data, and re-selecting an SID if the SID is being used by another device; or checking, by the first device, whether the SID is being used by another device after successive transmission of X data, and performing SID re-selection if the SID is being used by another device, wherein X is pre-determined, or configured by higher layer, or determined dynamically; or checking, by the first device, whether the SID is being used by another device when performing resource selection or re-selection, and re-selecting an SID if the SID is being used by another device.

Preferably, the resource selection or re-selection includes: performing at least one of the following actions when it is detected that the system load is larger than a pre-determined load:

reducing transmitting power;

reducing the number of physical resource blocks (PRBs) occupied in a subframe;

reducing the number of subframes occupied in a cyclic period;

increasing a threshold for performing received power-based resource selection or re-selection;

wherein the ratio of unavailable resources occupied by the first device is smaller than a pre-determined threshold, the unavailable resources are resources determined to be unavailable according to the measurement result.

Preferably, the system load is determined according to the following method:

determining, by the first device, the system load respectively according to the received power of another device and the total of received energy of all of subframes or sub-bands, wherein the system load is a proportion of the number of unavailable resources to the total number of resources; or determining, by the first device, the system load collectively according to the received power of another device and the total of received energy of all of subframes or sub-bands, wherein the system load is a proportion of the number of unavailable resources to the total number of resources.

Preferably, determining the system load includes:

judging, by the first device, whether a resource is available according to a measured value of the resource, and calculating the system load using a result of the judging; or estimating, by the first device, whether a resource after subframe n is available according to a measured value in a measurement window when resource selection or re-selection is performed in the subframe n, and calculating the system load using a result of the estimating.

Preferably, at least one of the following is performed when a data channel is mapped onto a subframe which includes a synchronization channel/broadcast channel:

transmitting both the synchronization channel/broadcast channel and the data channel; or first transmitting the synchronization channel/broadcast channel; or first transmitting the data channel.

Preferably, the first device always transmits an SA for scheduling the data channel.

The present application also provides a data transmission device which includes: a sensing module, a resource selecting module and a sending and receiving module;

the sensing module is configured to sense scheduling assignment (SA) and received power of another device, and/or total received energy of all of subframes or sub-bands of the device;

the resource selecting module is configured to perform resource selection or re-selection according to a sensing result of the sensing module; and the sending and receiving module is configured to perform data transmission using selected resources.

Advantageous Effects of Invention

The data transmission method and device can select optimal resources for data transmission to avoid impacts of collisions on data transmission, and can adjust system running state in case of congestion to improve system performance as much as possible.

BRIEF DESCRIPTION OF DRAWINGS

FIG. 1 is a schematic diagram illustrating the structure of an uplink subframe in a conventional LTE system;

FIG. 2 is a schematic diagram illustrating the structure of a conventional uplink subframe in which DMRS is transmitted in 4 OFDM symbols;

FIG. 3 is a schematic diagram illustrating conventional sensing-based channel resource selection/re-selection;

FIG. 4 is a flowchart illustrating a data transmission method in accordance with the present application;

FIG. 5 is a schematic diagram illustrating performing resource selection/re-selection for each resource respectively in accordance with embodiment one of the present application;

FIG. 6 is a schematic diagram illustrating a sensing window and a sensing operation in accordance with embodiment one of the present application;

FIG. 7 is a flowchart illustrating a process of handling collision in accordance with embodiment two of the present application;

FIG. 8 is a flowchart illustrating a process of handling collision in accordance with embodiment three of the present application;

FIG. 9 is a flowchart illustrating a process of handling congestion in accordance with embodiment four of the present application;

FIG. 10 is a schematic diagram illustrating allocating resources according to a plurality of cyclic periods in accordance with embodiment four of the present application;

FIG. 11 is a schematic diagram illustrating the structure of a data transmission device in accordance with the present application;

FIG. 12 is a schematic diagram illustrating periodically sensing part of subframes;

FIG. 13 is a schematic diagram illustrating sensing only part of subframes in accordance with example one;

FIG. 14 is a schematic diagram illustrating sensing only part of subframes in accordance with example two;

FIG. 15 is a schematic diagram illustrating sensing only part of subframes in accordance with example three; and FIG. 16 is a schematic diagram illustrating sensing only part of subframes.

MODE FOR THE INVENTION

The present disclosure is hereinafter further described in detail with reference to the accompanying drawings as well as examples so as to make the objective, technical solution and merits thereof more apparent.

In V2X communication, there may be a large amount of devices within an area, including vehicles, pedestrians and Roadside Units (RSUs), and all these devices may have the need of transmitting data. This makes collision and interference highly possible to occur when the devices transmit data.

Data of a device may be generated on a periodic basis, thereby the device may require periodic resource occupancy. Further, each data may be transmitted repetitively for K times (K is larger than or equal to 1) to avoid some devices cannot receive the data due to the restrictions of half-duplex. Accordingly, the above device may occupy resources periodically with a cyclic period of P, and occupy K subframes in each cyclic period. In other words, K resources are allocated to the device, and each resource is allocated according to the cyclic period P. After selecting a resource and occupying the resource for several cyclic periods, the device may release the resource, and re-perform resource selection. This is for avoiding continuous collisions when a neighboring device also selects the same resource. In each resource selection or re-selection, the number of cyclic periods, denoted by C, when the same resource is continuously occupied may be randomly generated within a range of $[P_{min}, P_{max}]$, and a resource which can be continuously occupied for C cyclic periods is selected. $P_{min}$ and $P_{max}$ may be pre-determined constant values or configured values, e.g., may be 5 and 15 respectively. Then, the initial value of a resource re-selection counter may be set to C, and the resource re-selection counter may be reduced by 1 after transmission of each data. When the resource re-selection counter counts to zero, resource re-selection is performed.

It is supposed the data transmission scheme of the device is as follows. The device transmits a control channel, hereinafter referred to as scheduling assignment (SA), specifying information such as time-frequency resources occupied by a data channel and modulation and coding scheme (MCS), or the like. Then the device transmits data in the scheduled data channel. In an LTE D2D/V2X system, the above SA is also referred to as PSCCH, the data channel is also referred to as PSSCH. For a device A, after correctly receiving SA transmitted by another device, device A may determine the subframe/sub-band occupied by a data channel scheduled by the SA according to information in the SA, and judge whether the sub-band of the data channel will be continuously occupied in the following one or multiple cyclic periods. The above mentioned subframe/sub-band refers to a sub-band in a subframe, is the unit of resource allocation. According to different designs of SA, an SA may specify whether the current resource will be continuously occupied in at least the next cyclic period. Or, an SA may specify whether the current resource will be continuously occupied in the following X cyclic periods. X is a pre-determined constant, or a value configured by higher layer, or a value dynamically indicated. X may be a constant, e.g., 1, or may be an integer in a value range from 1 to Xmax. Xmax is a constant larger than 1. Generally, when device A received the SA transmitted by device B and the resource scheduled by the SA is not released after subframe n, device A determines the device B will continuously occupy the resource.

According to the conventional resource selection/re-selection scheme as shown in FIG. 3, when device A performs resource selection/re-selection in subframe n, according to the sensing results of subframes in a sensing window [n−a, n−b], device A may determine resource occupancy situation in subsequent subframes of subframe n and select/re-select appropriate SA resource and data channel resource. In a sensing window, device B generally transmits data in multiple cyclic periods, and performs multiple transmissions of the same data in a cyclic period. Correspondingly, device A performs multiple sensing of device B in a sensing window. One sensing may include obtaining an average sensing value of received power of all PRBs occupied by device B. Alternatively, one sensing may include measuring received power of device B on resources occupied by device B using PRB or sub-band as granularity. The sub-band refers to multiple continuous PRBs. In the following, sub-band represents frequency resources, and one sub-band may include one or multiple PRBs. A data channel of a device may occupy one or multiple sub-bands in one subframe.

In order to avoid collision and reduce interference between devices to the greatest extent, the present application provides a data transmission method. FIG. 4 is a flowchart illustrating the method which may include the following procedures.

In step 401, device A senses SA and received power of other device(s), and/or senses the total received energy on all of subframes/sub-bands of device A.

After decoding to obtain information of an SA, device A may obtain precise information about channel occupation of the device that transmitted the SA. Based on a successfully decoded SA, received power of the device that transmitted the SA may further be measured. The received power may be obtained by measuring the received power of the SA, or by measuring the received power of DMRS of the data channel scheduled by the SA. As such, information about the received power may be used in assisting the resource selection/re-selection. Another information that may assist in resource selection/re-selection is the energy received from all of subframes/sub-bands in a resource pool. The energy refers to the total energy received on a sub-band, i.e., if multiple transmitting devices transmit signals on the same sub-band, the energy is the total energy of the superimposed signals from the multiple transmitting devices. When device A fails to receive the SA, the above energy can still be used in assisting resource selection/re-selection. But the absence of the information about future resource occupancy restricts the performance of device A in resource selection/re-selection.

In step 402, device A performs resource selection/re-selection according to a sensing result, and performs data transmission on the resource.

Supposing the SA includes the identity of device B, the identity may be used in identifying resources to be occupied by device B in multiple cyclic periods, and the resources may all be used in obtaining a reference value of received power of device B. Otherwise, supposing the SA does not include the identity of device B, after receiving an SA which corresponds to resources for initial transmission and re-transmission of a data, device A may only determine that the data whose initial transmission and re-transmission occupy the resources scheduled by the SA belongs to a certain device B, and thus may only obtain the received power of the device B when device B transmitting the data based on the resources.

Supposing device A performs the resource selection/re-selection in subframe n, regarding a device B, when device A has correctly decoded the SA of the device B and the resources assigned by the SA is not released after subframe n, the reference value of received power of the device B after subframe n may be determined according to a measured value of the received power of the device B within a sensing window. Particularly, supposing the SA does not include the identity of device B, when an SA specifies resources for initial transmission and re-transmission of a data, only the reference value of the received power of the device B after subframe n may be obtained according to a measured value of the received power of the initial transmission resources and the re-transmission resources scheduled by the SA. The present application does not limit the method of obtaining the reference value of the received power based on the measured value of the received power. Then, considering the SAs of the devices received in the sensing window, it may be determined whether a certain resource after subframe n can be used for transmission by device A according to scheduling information of the SAs and reference values of received power of the devices. In addition, device A may determine resource occupancy situation of resources subsequent to the subframe n according to some known or configured information about resource occupancy cyclic periods. The reference value of received energy in a subframe/sub-band after subframe n may be determined according to a measured value of received energy in each subframe/sub-band in the resource pool in the sensing window. As such, interference can be avoided to the greatest extent. For example, with respect to a sub-band in a subframe y which is subsequent to subframe n, the reference value of the received energy on the sub-band may be obtained according to a measured value of the received energy on the same sub-band in a subframe $y+k \times P_A$ in a sensing window; or the reference value of the received energy on the sub-band may be obtained according to a measured value of the received energy on the same sub band in a subframe $y+k \times P_A$ which is before the end of the sensing window. k is a positive integer. $P_A$ is the cyclic period of a reserved resource when device A performs the current resource re-selection. The reference value of the received energy may be equal to an average value or weighted average value or a moving average value of measured values of received energy in the above subframe. The present application does not limit the method of obtaining the reference value of the received energy based on the measured value of the received energy.

In some examples, when device A needs to occupy a resource for data transmission, device A may have not performed the above sensing operations, thus device A may not have any available information on received power and received energy. Or, in order to save power, device A may only performed a limited number of sensing operations and thus do not have enough information on received power and received energy. In those situations, device A may randomly select the resource to be occupied according to available information on received power and received energy.

The mechanism of the present disclosure is hereinafter described in detail with reference to five embodiments.

EMBODIMENT ONE

For a device A, when K resources are occupied by device A (K is larger than or equal to 1), the resources may have the same cyclic period. For a device A, when K resources are occupied by device A, it is also allowable that the K resources have different or not exactly the same cyclic periods. For example, device A occupies K1 resources, and the repetition period of the K1 resources is P1; device A also occupies K2 resources whose repetition period is P2. K1 and K2 are both larger than or equal to 1, the sum of K1 and K2 is K, and P1 is different from P2.

The timing doing selection/re-selection by device A may be common to the above K resources, i.e., when device A performs resource selection/re-selection, device A may select/re-select all of the K resources. It is supposed that device A occupies resources according to a cyclic period of P and occupies resources of K subframes in a cyclic period, e.g., perform K transmission of a data in a cyclic period, occupy all of the K resources repetitively for C successive cyclic periods after selecting K resources in a cyclic period. That is, during resource selection/re-selection, device A may first generate a random number for the cyclic periods of resource occupation, e.g., generating a uniform random number ranging from 5 to 15. Then device A selects K data channel resources in a cyclic period and occupy the selected resources for C successive cyclic periods according to a sensing result obtained from a sensing window. When the K resources have different cyclic periods, resources with smaller cyclic periods may generally be occupied more times than resources with larger cyclic periods.

A first method of selecting K resources is as follows. It is supposed that resource selection/re-selection is performed in subframe n, K data channel resources are determined according to a sensing result obtained from a sensing window [n−a, n−b], and the K resources remain available before the next resource re-selection. That is, when the resources have the same cyclic period, it is guaranteed that the K resources are available in C successive cyclic periods. When it is permitted that the K resources have different cyclic periods, each of the K resources is always available in each of its occupied cyclic period before the next resource re-selection. The above selection of K data channels may take time delay requirements of the traffic into consideration, e.g., if time delay requirement is 100 ms, the K data channel resources may be selected from the first 100 or less subframes from subframe n. As such, all of the K data channel resources are selected based on information of the sensing window corresponding to subframe n. In fact, the sensing operations are continuously performed by device A, e.g., continuously performed after subframe n−b, the above first method cannot fully use information detected after subframe n−b to reduce collision between devices.

A second method of selecting K resources is as follows. In the above subframe n, only the first resource is selected based on a sensing window [n−a, n−b]. Then, in subframe n+nk, the k'th resource is selected based on a sensing window [n+$n_k$−a, n+$n_k$−b], k=2, 3, . . . K. The parameter $n_k$ is the subframe position where device A selects the resource, and its value should ensure the selected resource satisfies the time delay requirement. $n_k$ may be pre-determined or configured by higher layer, or may be generated randomly, or may be decided by the device. Before the next resource re-selection, it is guaranteed that the K resources are always available, i.e., when the K resources have the same cyclic period, it is guaranteed that the K resources are always available in C successive cyclic periods. When it is permitted that the K resources have different cyclic periods, each of the K resources is always available in each of its occupied cyclic period before the next resource re-selection. The selection of each resource makes use of the newest sensing information at the current position, so as to avoid collision to the greatest extent. As shown in FIG. 5, supposing the device selects 2 resources in a cyclic period, when selecting the first resource, the device performs resource selection 502 based on sensing window 501, and obtains SA and data channel resources which are denoted respectively by 511 and 512. When selecting the second resource, the device performs resource selection 504 based on sensing window 503, and obtains SA and data channel resources which are denoted respectively by 513 and 514. The sensing windows 501 and 503 are partially overlapped with each other.

According to the above second method of selecting K resources, the timing of performing resource selection/re-selection of different resources may be independent from each other. Different resources may have the same or different occupancy cyclic periods. Supposing resource selection/re-selection of a resource is performed in subframe n, the number of cyclic periods in which the resource is to be occupied, denoted by $C_k$, is first generated, and a resource is selected according to a sensing result obtained from a sensing window [n−a, n−b]. The selected resource is available in $C_k$ successive cyclic periods. Alternatively, K resources occupied by device A may be divided into groups, and resource selection/re-selection may be performed for each group of resources, i.e., the timing of resource selection/re-selection of different groups of resources may be independent from each other. When resource selection/re-selection is required, device A may select/re-select a group of resources. Resources in the same group may be selected according to the sensing result obtained from the same sensing window. Alternatively, a proper sensing window may be determined for each resource in the same group. In some examples, resources having the same cyclic period may be assigned into the same group. In other examples, resources in one group may have different cyclic periods.

According to the above second method of selecting K resources, one SA may schedule only one data channel. Or, according to the method of performing resource selection/re-selection in groups, one SA may schedule data channels of one group. Or, according to current resource occupying situation of device A, the number of data channels scheduled by one SA may not be limited. For example, when device A needs to perform resource re-selection of a resource, an SA may not schedule the resource temporarily. Otherwise, the SA may schedule all of the K resources. Or, one SA may schedule only some of the K resources. Correspondingly, multiple different SAs may be transmitted for a data to specify the K resources. For example, K1 resources are scheduled by a first SA, and the first SA may be transmitted only once or transmitted K1 times. The other K2 resources are scheduled by a second SA, and the second SA may be transmitted only once or transmitted K2 times. The sum of K1 and K2 is K. When multiple SAs schedule the same data, it may be determined that the SAs are corresponding to multiple transmissions of the same data based on information in the SAs, e.g., the same SID, the same transmission block size (TBS), the same priority, or the like.

In some examples, when resource selection/re-selection is performed in subframe n, device A may not have performed the above sensing operations before subframe n, e.g., device A has just started up and thus has not performed any sensing operations. Or, device A may only performed limited sensing operations, e.g., only performed channel sensing in some subframes in the sensing window to save power. For a service triggered by an event, device A may not have performed sensing or only have performed limited sensing in advance. In this situation, since device A has very limited information sensed before subframe n, some examples provide the second method of selecting K resources to increase available sensed information for selecting a resource and thus better avoid collision.

Based on the above analysis, one of the above two methods may be used according to conditions. One of the above two methods may be selected based on the amount of current available sensed information of device A. That is, when there are very limited available sensed information, the above second method of selecting K resources may be performed; otherwise, the above first method of selecting K resources may be performed. Or, one of the above two methods may be determined according to the type of the UE. The above second method of selecting K resources may be used by a device with limited battery capacity, e.g., a mobile phone of a pedestrian which may not perform the above sensing operations or only perform limited sensing operations for saving power. In other situations where there's no power restrictions, e.g., a vehicle may continuously perform the above sensing, the above first method of selecting the K resources may be used. Or, one of the above two methods may be selected according to service types. Periodic services may use the first method of selecting K resource since a device may be required to continuously sensing the channel thus can always obtain sufficient sensed information. Services triggered by events may use the second method of selecting K resources since there may be limited sensed information.

After selecting a data channel resource of the K resources, device A may detect a collision in the data channel resource with another device based on latest sensed information before sending an SA corresponding to the data channel resource, and device A may still occupy the data channel resource. Or, device A may re-select an idle resource based on the latest sensed information to replace the resource where the collision is detected. In an example, when there is no other available idle resources, device A may still use the resource where a collision with another device is detected. The above collision detection may be in a moving manner, i.e., a collision detection may be performed in each subframe based on information of the newest sensing window. Or, the above collision detection may be performed only when selecting the k'th resource. If device A detects collision with other devices in one or multiple previously selected resources based on the newest detection result, device A may still occupy the resources. The latter method generates fewer overhead, but may result in inability of replacing one or multiple previously selected resources in which collision with other devices are detected due to the missing of the proper time.

SAs may be processed using the following methods. According to a first method, similar to the method of processing data channel, resources with the least interference may be selected, when possible, for transmitting an SA based on a result of checking an SA resource pool in a sensing window. In some examples, K SA resources may be selected in one cyclic period, and are occupied in C continuous cyclic periods. As such, the K SA resources are in a one-to-one correspondence relationship with the data channels. In some examples, selection of K SA resources may be performed respectively for each cyclic period, and it is not required that SA resources for different cyclic periods are the same. According to a second method, SA resources are randomly determined in each cyclic period without considering a sensing result obtained from a sensing window. For example, K SA resources are randomly selected in each cyclic period to be in a one-to-one correspondence relationship with data channel resources. In some examples, K SA resources may be randomly selected in one cyclic period, and are occupied in C continuous cyclic periods. As such, the K SA resources are in a one-to-one correspondence relationship with the data channels.

In an example, device A selects resources in a selecting window $[n+T_1, n+T_2]$. $T_1$ and $T_2$ are related with implementation of UE, e.g., $T_1 \leq 4$ and $20 \leq T_2 \leq 100$. $T_1$ is influenced by processing delay from the UE selects resources to the UE starts transmitting SA and data, and $T_2$ is mainly related with delay characteristics tolerable by the current service. A resource is in a subframe and occupies one or multiple continuous sub-channels. One sub-channel includes one or multiple continuous PRBs.

Corresponding to the above two sensing methods, device A may sense information in each subframe one by one, i.e., sensing received power of a device which transmitted an SA which has been corrected decoded, and sensing the total received energy in the subframe. In some cases, device A may skip some sensing operations in a subframe to reduce sensing operations of the device and save power. It is denoted that device A selects the above K resources and occupies the resources in C continuous cyclic periods, i.e., if the cyclic period of reserving resources by device A is P, the next resource re-selection performed by device A is after the time C·P; if the sensing window used by device A for resource re-selection has a length of W and if C·P>W, device A may suspend channel sensing after selecting the above K resources and re-start channel sensing at a time point which is time W ahead of the next resource re-selection to save power. As shown in FIG. 6, if C equals 2, the device performs resource selection 602 to obtain data channel resources 611~613 based on a sensing window 601. Device A suspends sensing received power and received energy and re-starts sensing at a time point which is time W ahead of the time of the next resource selection 604 to obtain sensed information in sensing window 603. The device performs resource selection 604 to obtain new data channel resources 614~616 based on sensing window 603.

According to 3GPP, vehicle-type user equipment (VUE) performs sensing in N subframes before performing resource re-selection, N equals 1000, i.e., resources may be selected based on sensed information obtained from at most N subframes. In the method as shown in FIG. 6, the length W of a sensing window may equal N, and W has the same value for devices of all types. Pedestrian-type user equipment (PUE) has limited battery capacity, thus how to pro-long communication time is a problem yet to be solved. In order to reduce power consumption, one solution is to try to reduce the time of a PUE performs reception to the greatest extent. As such, when performing sense-based resource selection/re-selection, device A may perform sensing only in some of the subframes. For example, device A may only sense a portion of the above N subframes to reduce power consumption. In FIG. 6, the value of W may be in connection with the type of the device. For example, a VUE may be configured with a sensing window with a larger length, e.g., W equals N, because a VUE does not have restrictions from battery capacity. A PUE may be configured with a sensing window with a smaller length, i.e., W<N, to save power. In the method as shown in FIG. 6, the length W of the sensing window may equal $W_N$, $W_N$ and may be larger than N, $W_N$ is a constant, or a value configured by higher layer or a pre-determined value; or, $W_N$ may equal c·N, c is a constant larger than 1 or a value configured by higher layer or a pre-determined value, and W is the same for devices of all types. According to this method, even if the arrival time of a data packet is subject to a change at the time of resource re-selection, the resource re-selection may still be performed with sufficient sensed information. In some examples, device A may only sense a portion of the above $W_N$ subframes to reduce power consumption. In FIG. 6, the value of W may be in connection with the type of the device. For example, a VUE may be configured with a sensing window with a larger length, e.g., W equals $W_N$, because a VUE does not have restrictions from battery capacity. A PUE may be configured with a sensing window with a smaller length, i.e., $W_N$, to save power. In some examples, W may be smaller than or equal to N. When W<1000, the method as shown in FIG. 6 may not be used for sensing data transmission of other devices whose cyclic periods are relatively longer, e.g., 1000, thus collision with a device having a longer cyclic period may not be avoided.

As shown in FIG. 12, device A may sense a channel according to a cyclic period of Pw, e.g., Pw is 100, and sense only S subframes within an actual sensing period in each cyclic period, S is smaller than 100. According to the method, transmissions with various cyclic periods in the above period of S subframes may be sensed. Correspondingly, collision can be avoided to the greatest extent as long as resource selection is performed in a subframe corresponding to the above S subframes.

In the method as shown in FIG. 12, a sensing window may be divided into multiple sub-windows according to a cyclic period of Pw, e.g., Pw is 100 and a sensing window with a length of 1000 may be divided into 10 sub-windows, and S subframes are sensed in each sub-window. In some examples, an SA only indicates resource release or only resources for the next data transmission is reserved according to a resource reservation interval $P_q$ specified by an SA, $P_q \in Q$, Q is a set of resource reserve cyclic periods $P_q$, and Q is pre-defined, or configured by higher layer signaling or pre-configured. Device A may perform sensing only in a sub-window corresponding to a reservation interval $P_q$ in the set Q, to further reduce power consumption. In another example, device A may perform sensing only in a sub window corresponding to a reservation interval $P_q$ in the set Q, and $P_q \geq P_w$. Denoting the index of a subframe in a selecting window by m, subframe $m-P_q$ falls in the sub-window corresponding to $P_q$. That is, for the above subframe m, device A shall sense subframe $m-P_q$ in the sensing window, $P_q \in Q$, or $P_q \in Q$ and $P_q \geq P_w$. Devices transmitting in other sub-windows may not reserve resources in the selection window according to the reservation interval in the set Q, thus, no resource collision may occur even if device A does not check the above other sub-windows. For example, when device A has a service period of 1000, the set includes all of reserve periods, i.e., 100×k' k=1,2, . . . 10, device A may sense S subframes in each sub-window of the above 10 sub-windows. If the set Q does not include all of the reserve periods, device A does not have to sense S subframes in each sub-window of the above 10 sub-windows. As shown in FIG. 16, when the set Q includes reservation intervals {100, 200, 300, 500, 1000}, device A only needs to sense sub-windows 1601, 1606, 1608, 1609 and 1610 to have all transmissions performed by a device which is possible to reserve resources in selecting window (1611).

In another example, device A may perform sensing in a sub window corresponding to a superset Q' which includes the set Q. In particular, Q' may be Q. In another example, device A may perform sensing in a sub window corresponding to at least one element of a superset Q', the superset Q' includes all of elements $P_q$ of the set Q, $P_q \geq P_w$. In particular, Q' may only include all of elements $P_q$ of the set Q, $P_q \geq P_w$. For example, the value range of each element of Q' is 100×[1,2, . . . , 10]. Herein, when a subframe in a selecting window has an index denoted by m, a subframe m–p falls into a sub window corresponding to the above element p, p∈Q'. That is, for the above subframe m, device A shall sense subframe m–p in the sensing window, p∈Q'. The above superset Q' may be pre-defined, configured by higher layer signaling, pre-configured or determined according to implementation of device A. For example, as shown in FIG. 16, supposing the set Q includes reservation intervals {100, 200, 300, 500, 1000}, device A may be configured to sense only sub windows 1601, 1606, 1608, 1609 and 1610; alternatively, device A may be configured to sense sub windows 1601, 1606, 1608, 1609 and 1610, and sense some or all of the other five sensing sub windows 1602-1604 and 1607.

In addition, device A may also need to measure received energy in each sub-channel of each subframe in a sensing window. Device A may measure the received energy in a sub-window corresponding to a reserve cyclic period in the above set Q. In addition, it may be ruled that device A senses at least X sub-windows in the sensing window to ensure the accuracy of the average value of the received energy. X is a pre-defined constant related with implementation of the device, and may be a value configured by higher layer or a pre-configured value. As such, when the set Q includes fewer than X reserve cyclic periods, device A may also measure the received energy in $X-N_Q$ sub-windows besides measuring the received energy in sub-windows corresponding to reserve cyclic periods in the set Q. The number of elements in the set Q is denoted by $N_Q$. In some examples, the above $X-N_Q$ sub-windows may be sub-windows which are not sub-windows corresponding to reserve cyclic periods in the set Q and are in the shortest distance from the subframe n. In some other examples, the position of the above $X-N_Q$ sub-windows may be random or determined by implementation of the UE.

In a sensing window having a length of W, W is larger than N, equal to N or smaller than N. Device A may sense only a portion of the subframes. For example, according to the method as shown in FIG. 12, only S subframes may be sensed in each cyclic period whose length is Pw. As shown in FIG. 13, supposing C is 3, device A may suspend channel sensing after selecting the above K resources (1302) based on the sensing window (1301), and re-start sensing (1303) at a time point which is prior to the time point of the next resource re-selection (1304) by a time period W. In the sensing window having the length of W, device A may sense channels according to a cyclic period Pw and only sense S subframes within an actual sensing time period in each cyclic period to further reduce power consumption. According to the method, transmissions with various cyclic periods in the above period of S subframes may be sensed. As such, collision can be avoided to the greatest extent as long as resource selection is performed in a subframe within the above S subframes. In this method, the sensing window with a length of W is divided into multiple sub-windows according to a cyclic period Pw, e.g., W is 1000, a sensing window can be divided into 10 sub-windows when Pw is 100. When a set of reservation intervals is Q, device A may also perform sensing only in sub-windows corresponding to reservation intervals $P_q$ in the set Q to further reduce power consumption. Or, device A may perform sensing only in a sub window corresponding to a reservation interval $P_q$ in set Q, $P_q \geq P_w$. Or, device A may perform sensing in a sub window corresponding to an element of a superset Q' which includes the set Q. In particular, Q' may be Q. In another example, device A may perform sensing in a sub window corresponding to at least one element of a superset Q', the superset Q' includes all of elements $P_q$ of the set Q, $P_q \geq P_w$. In particular, Q' may only include all of elements $P_q$ of the set, Q, $P_q \geq P_w$. Or, device A may sense SA and measure the received power and received energy in sub-windows corresponding to reservation intervals $P_q$ in the set Q, and measure received energy in at least X sub-windows.

In the above sensing window with a length of W, device A may perform no sensing operation on some subframes, e.g., due to restrictions of half-duplexing which makes device A unable to perform sensing on a subframe while transmitting on the subframe, or due to other reasons such as saving power which makes device A does not perform sensing on a subframe. When performing resource selection, device A may consider influences of possible data transmission from other devices on the subframe on which no sensing is performed.

According to a first method of processing a subframe on which no sensing operation is performed, referred to as unsensed subframe, when there is a subframe m on which no sensing operation is performed in the sensing window, all of subframes $z=m+P_q$ subsequent to subframe n may not be used by device A, $P_q$ is a resource reserve cyclic period, $P_q \in Q$. A single-subframe resource in a selecting window $[n+T_1, n+T_2]$ is denoted by $R_{x,y}$, i.e., $R_{x,y}$, is on subframe y and includes one or multiple successive sub bands starting from sub band x. When there is a j which makes $y+j \cdot P_A$ equals z, $R_{x,y}$ is unavailable to device A, j is an integer smaller than C but not smaller than 0, C is the number of periods in which device A is to reserve resource according to the cyclic period $P_A$.

According to a second method of processing an unsensed subframe, when there is a subframe m on which no sensing operation is performed in the sensing window, all of subframes $z=m+P_q$ subsequent to subframe n may not be used by device A, $P_q$ is a resource reserve cyclic period, $P_q \in Q$ and $P_q \geq P_w$. When there is a j which makes $y+j \cdot P_A$ equals z, $R_{x,y}$ is unavailable to device A.

According to a third method of processing an unsensed subframe, only a subframe on which no sensing operation is performed within a sub window of a reservation interval $P_q$ which is available for data transmission may be processed, $P_q \in Q$. That is, a subframe m on which no sensing operation is performed is to be processed only when there is a subframe $m+P_q$ in the selecting window, $P_q \in Q$. For the above subframe m, all of subframes $z=m+P_q$ subsequent to subframe n are not allowed to be used by device A, $P_q$ is a resource reserve cyclic period, $P_q \in Q$. When there is a j which makes $y+j \cdot P_A$ equals z, $R_{x,y}$ is unavailable to device A.

According to a fourth method of processing an unsensed subframe, only a subframe on which no sensing operation is performed within a sub window of a reservation interval $P_q$ which is available for data transmission may be processed, $P_q \in Q$ and $P_q \geq P_w$. That is, a subframe m on which no sensing operation is performed is to be processed only when there is a subframe $m+P_q$ in the selecting window, $P_q \in Q$ and $P_q \geq P_w$. For the above subframe m, all of subframes $P_q$ is a resource reserve cyclic period, $P_q \in Q$ and $P_q \geq P_w$. When there is a j which makes $y+j \cdot P_A$ equals z, $R_{x,y}$ is unavailable to device A.

According to a fifth method of processing an unsensed subframe, only a subframe on which no sensing operation is performed within a sub window on which a sensing operation is performed by device A may be processed. For the above subframe m, all of subframes $z=m+P_q$ subsequent to subframe n are not allowed to be used by device A, $P_q$ is a resource reserve cyclic period, $P_q \in Q$. When there is a j which makes $y+j \cdot P_A$ equals z, $R_{x,y}$ is unavailable to device A.

According to a sixth method of processing an unsensed subframe, only a subframe on which no sensing operation is performed within a sub window on which a sensing operation is performed by device A may be processed when device A is allowed to perform no sensing operation on a sub window corresponding to the reserve cyclic period $P'_q$, $P'_q < P_w$. For the above subframe m, all of subframes $z=m+P_q$ subsequent to subframe n are not allowed to be used by device A, $P_q$ is a resource reserve cyclic period, $P_q \in Q$ and $P_q \geq P_w$. When there is a j which makes $y+j \cdot P_A$ equals z, $R_{x,y}$ is unavailable to device A.

According to the above method of performing sensing on sub windows, device A performs sensing at least in sub windows of reservation interval $P_q$ which is available for data transmission in the sensing window, $P_q \in Q$. According to the above first, third and fifth method of processing an unsensed subframe, when the above method of performing sensing on sub windows is not applied, supposing there is a reservation interval $P_{q0}$, $P_{q0} \in Q$, device A does not sense a sub window corresponding to $P_{q0}$, i.e., the device performs no sensing on a subframe s within the sub window corresponding to $P_{q0}$. According to the reservation interval $s+P_{q0}$ may be within the selecting window of device A, thus all of subframes within the selecting window cannot be used for resource selection, and device A cannot select resources based on the sensing in the sensing window.

According to the above method of performing sensing on sub windows, device A performs sensing at least in sub windows of reservation interval $P_q$ which is available for data transmission in the sensing window, $P_q \in Q$ and $P_q \geq P_w$.

According to the above second, fourth and sixth method of processing an unsensed subframe, when the above method of performing sensing on sub windows is not applied, supposing there is a reservation interval $P_{q0}$, $P_{q0} \in Q$ and $P_q \geq P_w$, device A does not sense a sub window corresponding to $P_{q0}$, i.e., the device performs no sensing on a subframe s within the sub window corresponding to $P_{q0}$. According to the reservation interval $P_{q0}$, subframe $s+P_{q0}$ may be within the selecting window of device A, thus all of subframes within the selecting window cannot be used for resource selection, and device A cannot select resources based on the sensing in the sensing window. Since device A is allowed to perform no sensing on subframe $m-P'_q$, the reserve cyclic period $P'_q$ is not taken into consideration when processing unsensed subframes in order to avoid all candidate resources in the selecting window becoming unavailable due to the unsensed subframe in the sub window corresponding to the reserve cyclic period $P'_q$. In fact, there is relatively fewer traffic using the reserve cyclic period $P'_q$ within a resource pool, thus neglecting the reserve cyclic period $P'_q$ has very little impact on system performances.

According to the above method of performing sensing in a sub window corresponding to an element in the superset Q', device A does not perform sensing in other sub windows in the sensing window, i.e., the sub window in which subframe m−p falls, $p \notin Q'$, m is the index of a subframe in the selecting window. That is, for the subframe m, device A does not perform sensing on subframe m−p in the sensing window, $p \notin Q'$. According to the above first and second method of processing an unsensed subframe, for the above unsensed subframe m−p, all of subframes $z=m-p+P_q$ subsequent to subframe n are not allowed to be used by device A, $P_q$ is a resource reserve cyclic period, $P_q \in Q$. In order to avoid all candidate resources in the selecting window becoming unavailable due to the unsensed subframe, for a single-subframe resource $R_{x,y}$, there cannot exist a j which makes $y+j \cdot P_A$ equals z, j is an integer smaller than C but not smaller than 0, C is the number of periods in which device A is to reserve resource according to the cyclic period $P_A$. The above requirement restricts the value of p, $p \in Q'$, thus restricts the value of elements of superset Q'. The above restrictions may be considered when the superset Q' is pre-defined, configured or pre-configured.

According to a seventh method of processing an unsensed subframe, device A may not consider the impact of possible data transmission of other devices on the unsensed subframe when performing resource selection. As such, device A may perform sensing in a sub window corresponding to an element in set Q''. Denoting the index of a subframe in the selecting window by m, the sub window in which subframe m−p falls is the above sub window corresponding to element p, $p \in Q''$. That is, for the above subframe m, device A shall sense a subframe m−p in the sensing window, $p \in Q''$. Q'' may be pre-defined, configured by higher layer signaling, pre-configured or determined according to implementation of device A. Q'' may be in connection with Q, or may be independent from Q. For example, the value range of each element of Q'' is 100×[1,2, . . . , 10]. There may exist a reservation interval $P_{q0}$, $P_{q0} \in Q$, and device A does not perform sensing in a sub window corresponding to $P_{q0}$, i.e., the device does not perform sensing on a subframe s in the sub window corresponding to $P_{q0}$. According to the reservation interval $P_{q0}$, subframe $s+P_{q0}$ may be in the selecting window of device A. Since the device does not process an unsensed subframe, device A is not prevented from selecting resource based on the sensing in the sensing window.

In the method as shown in FIG. 6 and FIG. 13, device A perform channel sensing only in a sensing window which is prior to the time point of resource re-selection. If device A may accurately predict the time point of resource re-selection, the method may work well. But device A may need to re-select resources before the time point of resource re-selection due to changes in service status after selecting and reserving resources. In such cases, the method as shown in FIG. 6 and FIG. 13 may result in no available sensed information or only limited sensed information when resource re-selection is shifted to an earlier time point, which may impact the performances of resource re-selection. Generally, according to the method as shown in FIG. 6 and FIG. 13, device A performs channel sensing only in a sensing window prior to the time point of resource re-selection, thus may have no available sensed information or only limited sensed information when the time point of resource re-selection is changed according to the needs. When resource re-selection is necessary, device A may adjust the resource re-selection method if device A has no available sensed information or only limited sensed information. If device A has multiple available resource pools, when there is no available sensed information or only limited sensed information in one resource pool, device A may select resources using another resource pool. Preferably, the resource pool for resource re-selection has a load no larger than a certain threshold. The above multiple resource pools configured for device A may occupy different carriers, and/or occupy different time-frequency resources on the same carrier. If device A is configured with multiple sense-based resource pools, when there is no available sensed information or only limited sensed information in one of the resource pools, device A may first re-select resources from another resource pool in which enough sensed information has been obtained. If device A is configured with the above sense-based resource pools and a random selection-based resource pool, when there is no available sensed information or only limited sensed information in all of the sense-based resources pools, device A may randomly select resources from the random selection-based resource pool. Device A may randomly select a resource and transmit only one data, i.e., not reserving the resource. Or, device A may randomly select a resource and reserve the resource for multiple cyclic periods to transmit multiple data. When device A does not have other available resource pools, e.g., device A is configured with only one resource pool or the load of other configured resource pools exceeds the threshold, device A may discard the current data, i.e., not performing resource re-selection. Or, device A may re-select a resource from the one resource pool. Device A may randomly select a resource and transmit only one data, i.e., not reserving the resource. Or, device A may randomly select a resource and reserve the resource for multiple cyclic periods to transmit multiple data. Or, device A may randomly select a resource based on available sensed information and transmit only one data, i.e., not reserving the resource. Or, device A may select a resource based on available sensed information and reserve the resource for multiple cyclic periods to transmit multiple data. The events that resource re-selection is shifted to an earlier time due to the above change in service state may not appear often, thus the methods shown in FIG. 6 and FIG. 13 are applicable to most cases.

In order to further improve the performances, device A may continue performing the sensing before the sensing window whose length is W prior to the expected time point of resource re-selection after selecting the above K resources, and the sensed subframes has a smaller ratio than those sensed subframes in the sensing window of length W. The above expected time point of resource re-selection may be obtained according to C which is the number of cyclic periods of reserving resources. In another example, during transmission after selecting the above K resources, device A may adjust the expected time point of resource re-selection according to some information. The method of determining the expected time point of resource re-selection is not limited herein.

As shown in FIG. 14, supposing C is 3, after selecting the above K resources (1421), device A may continue performing the sensing with shorter sensing windows (1402 and 1403), i.e., W'<W, until a time point which is time W ahead of the time point of the next resource re-selection (1422) and start performing sensing using a sensing window (1404) whose length is W. In the method of FIG. 14, because W' is shorter, device A cannot sense data transmission in a longer period, e.g., 1000, of another device. Resource re-selection based on short sensing windows may cause collision with those devices with longer periods.

In other examples, as shown in FIG. 15, supposing C is 3, device A performs sensing in a sensing window (1501), i.e., device A may perform channel sensing according to a cyclic period Pw and sense only S subframes in an actual sensing time period in each cyclic period. After selecting the K resources (1521) based on the sensing window (1501), device A may continue sensing. Device A may perform channel sensing according to a cyclic period Pw' and sense only R subframes in an actual sensing time period in each cyclic period. Pw' may be identical to or different from Pw. R<S. The above R subframes may be a subset of the S subframes to reduce power consumption. Until a time point which is time W ahead of the next resource re-selection (1522), normal sensing procedure (1502) is recovered, i.e., re-start channel sensing according to a cyclic period Pw and sense only S subframes in an actual sensing time period in each cyclic period. According to the method, since R subframes have been sensed in an actual sensing period according to a cyclic period of Pw' and data transmission of various cyclic periods has been sensed in the duration of the R subframes, when resource re-selection based on sensing of the above R subframes is required, inter-device collision can be avoided to the greatest extent as long as the resource selection is limited to subframes corresponding to the R subframes.

According to the method of FIG. 14 and FIG. 15, device A still performs sensing operations between two sensing windows whose length is W to provide sensed information to assist resource re-selection in case the time of resource selection is shifted to an earlier time due to service changes, so as to avoid inter-device collision as much as possible. Since the proportion of sensed subframes is smaller, the collision avoidance capability is not as good as that of the sensing based on sensing windows having a length of W.

Or, device A may divide a time period before the expected time point of resource re-selection into multiple sensing windows each of which has a length of W, e.g., W may be 1000, after a resource re-selection. In a sensing window immediately ahead of the expected time point of resource re-selection, device A may sense a sub-window according to a reservation interval in set $Q_1$; in other sensing windows ahead of the sensing window, device A may sense a sub-window according to a reservation interval in set $Q_2$. The set $Q_2$ is a subset of the set $Q_1$ to reduce power consumed by the sensing. $Q_1$ and $Q_2$ may be pre-defined, configured or pre-configured by higher layer signaling. Particularly, the set $Q_1$ may include all possible reservation intervals, i.e., the sensing is performed in all of sub-windows in the sensing window. According to the method, when service transmission of device A is mostly periodic, certain sensed information can be provided for assisting resource re-selection in case resource selection is shifted to an earlier time due to some reasons, so avoid inter-device collision as much as possible. Since the proportion of sensed subframes is smaller, the collision avoidance capability is not as good as that of the sensing based on sensing windows having a length of W.

When sensing SA and measuring the received power of a device that transmits the SA, after correctly decoding an SA, device A may judge whether it is necessary to measure the received power of the data channel scheduled by the SA according to resource location and reservation information specified by the SA. Specifically, a device needs to measure the received power of a data channel scheduled by the SA only in one or multiple of the following situations.

1) At least one of resources scheduled by the SA is in the selecting window.

2) At least one of resources reserved by the SA is in the selecting window.

3) At least one of resources scheduled by the SA is after the selecting window, denote the resource is in subframe y, and there is a k which makes subframe $y-k \times P_A$ locate in the selecting window, k is a non-negative integer, $P_A$ is a reservation interval of a reserved resource used by device A in current resource re-selection.

4) At least one of resources reserved by the SA is after the selecting window, denote the resource is in subframe y, and there is a k which makes subframe $y-k \times P_A$ locate in the selecting window, k is a non-negative integer.

Supposing device A has correctly received an SA and the SA specifies K transmissions of a data, e.g., when K is 2, the SA specifies resources for initial transmission and re-transmission, device A may obtain the received power by measuring only one of the above K resources, and use the received power in processing resource occupancy and/or reservation of the above K resources during resource selection/re-selection. For example, device A may measure only the last resource of the above K resources in the sensing window to obtain the received power.

EMBODIMENT TWO

It is supposed that a device occupies resources according to a cyclic period of P, and occupies resources of K subframes in one cyclic period, e.g., perform K transmissions of one data in a cyclic period. In other words, K resources are allocated to the device, and each resource is allocated according to the cyclic period P. After selecting a resource and occupying the resource for several cyclic periods, the device may release the resource, and re-perform resource selection. Besides, when the device detects a collision, i.e., the device finds out a correctly decoded SA schedules a subframe/sub-band which is in conflict with a data channel resource of the device by receiving an SA of another device, resource re-selection may be performed in some cases.

In order to enable effective resource selection/re-selection, device A may perform channel sensing in a sensing window immediately ahead of subframe n in which resource selection/re-selection is to be performed, and the sensing window should reach a certain length, so that enough measurement information can be collected.

As shown in FIG. 7, in step 701, a processing scheme may be selected according to whether device A has performed enough sensing operations in the sensing window. When device A has collected enough information from the sensing window, collision can be avoided as much as possible. In this situation, since the resource selection/re-selection has taken interference from adjacent other devices well in consideration, the possibility of a collision is very low. As such, before the next resource selection/re-selection, device A may continue occupying the resource even if device A finds out a collision with another device based on a received SA, i.e., step 702 is performed.

In some examples, however, when resource selection is performed in subframe n, device A may not have performed the above sensing operations before subframe n, e.g., device A has just started up and thus has not performed any sensing operations. Or, device A may only performed limited sensing operations, e.g., only performed channel sensing in some subframes in the sensing window to save power. For a service triggered by an event, device A may not have performed sensing or only have performed limited sensing in advance. In the above situations, device A may either randomly select a resource, or perform resource selection/re-selection based on obtained limited sensed information, which may increase the possibility of collision with other devices. In such cases, step 703 may be performed to have some measures to reduce the impact of collision.

In order to reduce the impact of collision under the above resource selection method, device A may be configured to occupy the resource for a relatively short time period, i.e., the time of occupying resources is shorter than the time of occupying resources selected with enough sensed information. For example, for resources selected/re-selected according to sufficient sensed information, the number of cyclic periods in which a resource is repeatedly occupied may have a minimum value denoted by $P_{min}$ and a maximum value denoted by $P_{max}$, e.g., 5 and 15; for resources selected/re-selected according to not sufficient sensed information, the number of cyclic periods in which the resource is repeatedly occupied may be set to be smaller, with a minimum value denoted by $P'_{min}$ and a maximum value denoted by $P'_{max}$, $P'_{min} \leq P_{min}$, $P'_{max} \leq P_{max}$. For example, $P'_{min} = P'_{max} = 5$.

In the above situations, since collision is more likely to occur, when device A detects a collision, resource re-selection may be performed.

In an example, device A selects a resource and wants to occupy the resource for C cyclic periods, and an SA specifies J which is the number of cyclic periods in which the resource is to be reserved, e.g., specifying resource release or resource reservation for the next cyclic period, or specifying resource release or resource reservation for one or multiple subsequent cyclic periods. The J may be specified in an individual domain in the SA, or may be jointly encoded with other information. J is smaller than or equal to C. When a collision is detected in a resource scheduled by the SA transmitted by device A, if the SA specifies resource reservation, the number of cyclic periods of resource reservation specified in the current SA is denoted by J0, the resource which is reserved for J0 cyclic periods is continued to be occupied for data transmission. After the reserved J0 cyclic periods ends, device A performs resource re-selection. Or, after a collision is detected, device may occupy the selected resource in at least Cmin cyclic periods starting from the time point of the previous resource selection. Cmin is a value configured by higher layer signaling or a pre-defined constant, and Cmin may be smaller than or equal to $P_{min}$. That is, if the number of cyclic periods in which device A occupies the resource selected in the previous resource selection, including the above J0 cyclic periods, is smaller than Cmin, device A may continue occupying the resource, and not perform resource re-selection until the occupying time period reaches Cmin cyclic periods. If the number of cyclic periods in which device A occupies the resource selected in the previous resource selection is not smaller than Cmin, device A may perform resource re-selection after the reserved J0 cyclic periods ends. In the remaining cyclic periods, device A may set J which is the number of reserved cyclic periods in an SA to specify the number of remaining cyclic periods. For example, when SA only specifies resource release or reserving resource for the next cyclic period, and the number of reserved cyclic period J0 is 1, device A may set the number of reserved cyclic periods J to be 0 when performing data transmission in the reserved 1 cyclic period.

Or, resource re-selection may be performed after device A detects a collision in a cyclic period and the collision may re-occur in a subsequent cyclic period. Specifically, when device A detects a collision with transmission of another device in the current cyclic period and an SA of the another device specifies resource release, i.e., the collision will not happen in a subsequent cyclic period, the resource re-selection may not be performed. When device A detects a collision with transmission from another device in the current cyclic period, device A may have another collision with the another device according to C which is the number of cyclic periods in which the resource is reserved after the previous resource re-selection, and the following methods may be carried out. According to a first method, the above described method may be carried out, i.e., performing resource re-selection after transmission of subsequent J0 cyclic periods or of the minimum number Cmin of cyclic periods is completed. According to a second method, if device A will not have a collision with the another device after subsequent J0 cyclic periods, the resource re-selection may not be performed. If device A will have a collision with the another device after subsequent J0 cyclic periods, the resource re-selection may be performed. Or, if the number of cyclic periods in which device A occupies the resource selected in the previous resource selection, including the J0 cyclic periods, is smaller than Cmin, resource re-selection is not performed if device A will not have a collision again with the another device after the number of cyclic periods in which device A occupies the resource selected in the previous resource selection reaches Cmin. If the number of cyclic periods in which device A occupies the resource selected in the previous resource selection, including the J0 cyclic periods, is not smaller than Cmin, resource re-selection is not performed if device A will not have a collision again with the another device after subsequent J0 cyclic periods. If device A will have a collision with the another device, the resource re-selection may be performed.

According to the method, when a collision is detected, device A is not required to occupy the resource in C cyclic periods which speeds up resource re-selection of device A, thus extra collisions can be avoided. Although device A does not occupy the resource in C cyclic periods, device A has completed all of resource occupancy according to instructions in the SA, thus will not affect decoding of SA and resource selection/re-selection of other devices. The method may be applied only to situations where device A has not performed sensing operations or only has performed limited sensing operations, or applied to all of data transmission of device A.

A first resource re-selection method is, after a collision is detected, device A completes data transmission on K resources in a cyclic period before performing resource re-selection. When device A has transmitted some SAs which schedule the above K resources for one cyclic period before detecting the collision, device A may configure remaining SAs to specify resource release when transmitting the remaining SAs. Accordingly, when a receiving device receives an SA of a transmitting device, if K1 SAs in one cyclic period specify resource occupancy and subsequent K2 SAs in the same cyclic period specify resource release, the receiving device may regard all of K1+K2 resources are released. When device A has transmitted all of SAs of a cyclic period or does not have time to modify contents of the SAs when a collision is detected, i.e., all of SAs in the cyclic period fail to specify resource release, device A may release all of the resources and perform resource re-selection after completing SAs and data transmission of the cyclic period.

A second resource re-selection method is, after a collision is detected, device A may perform resource re-selection after completing data transmission on K resources in a cyclic period and indicating resource release in at least one SA. When device A has transmitted some SAs which schedule the above K resources for one cyclic period before detecting the collision, device A may configure remaining SAs to specify resource release when transmitting the remaining SAs. When device A has transmitted all of SAs of a cyclic period or does not have time to modify contents of the SAs when a collision is detected, device A may continue occupy the K resources in the next cyclic period, and indicate resource release in all of SAs of the next cyclic period.

A third resource re-selection method is, after a collision is detected, device A may perform resource re-selection after a cyclic period ends only when all SAs in the cyclic period specify resource release. For example, supposing device A has transmitted some of SAs scheduling the above K resources of a cyclic period and data channels when a collision is detected, device A may continue transmitting the other SAs and data channels of the cyclic period, and the SAs do not specify resource release. Starting from the next cyclic period, all of SAs scheduling the K resources specify resource release, and resource re-selection is performed when the next cyclic period ends. When device A has not transmitted SAs and data channels of a cyclic period when a collision is detected and device A has enough time to adjust content of the SAs to specify resource release, device A may specify resource release in all of SAs of the cyclic period, and perform resource re-selection after the cyclic period ends.

A fourth method of resource re-selection is, when device A performs resource selection/re-selection respectively for each of the K resources, e.g., as in the method of embodiment one, when a collision is detected, device A may perform resource re-selection for the resource in which the collision is detected. Device A may not specify releasing the resource, and directly perform resource re-selection. For example, when a collision is detected, if device A has not transmitted an SA and data channel of the resource in which the collision is detected, and if device A has enough time to select a new resource for the SA and the data channel, device A may directly release the resource and occupy channels in the new SA and data channel. If device A does not have enough time to select a new resource for the SA and the data channel, device A may still occupy the resource in the current cyclic period and re-select a new resource which is to be occupied in the next cyclic period. Or, device A may re-select the resource only after transmitting an SA indicating resource release. For example, after a collision is detected, if device A has enough time in the current cyclic period to adjust content of an SA, device A may transmit an SA which indicates resource release, and re-select a new resource which is to be occupied in the next cyclic period. If device A does not have enough time in the current cyclic period to adjust the content of the SA, device A may still occupy the resource in the next cyclic period, transmit an SA indicating resource release, and re-select a new resource.

A fifth method of resource re-selection is, when device A divides K resources into groups and performs resource selection/re-selection respectively for each of the groups, e.g., as in the method of embodiment one, after a collision is detected, device A may perform resource re-selection for the group of resources in which the collision is detected. After a collision is detected, if device A has not occupied the group of resources in the current cyclic period and has enough time to select a new group of resources, device A may directly release the group of resources in which the collision is detected, and occupy the newly-selected group of resources. If device A has occupied the group of resources in the current cyclic period or does not have enough time to select a new group of resources, device A may still occupy the group of resources in the current cyclic period and re-select a new group of resources which is to be occupied in the next cyclic period. Or, device A may re-select the resource only after transmitting an SA indicating resource release. For example, after a collision is detected, if device A has not transmitted an SA for the group of resources in the current cyclic period and has enough time in the current cyclic period to adjust content of the SA, device A may transmit an SA which indicates resource release, and re-select a new group of resources which is to be occupied in the next cyclic period. If device A has transmitted an SA for the group of resources in the current cyclic period or does not have enough time in the current cyclic period to adjust content of the SA, device A may still occupy the resource in the next cyclic period, transmit an SA indicating resource release, and re-select a new group of resources.

EMBODIMENT THREE

It is supposed that a device occupies resources according to a cyclic period of P, and occupies resources of K subframes in a cyclic period, e.g., perform K transmissions of one data in a cyclic period. In other words, K resources are allocated to the device, and each resource is periodically allocated according to the cyclic period P. After selecting a resource and occupying the resource for several cyclic periods, the device may release the resource, and re-perform resource selection. In some examples, resource re-selection may be performed.

With respect to a device A, device A may first transmit an SA which specifies a data channel resource being occupied and other parameters for controlling data transmission. The parameters may include one or multiple of the following:

modulation and coding scheme (MCS), which can be used together with the number of occupied PRBs to obtain the size of transmitted transmission blocks, i.e., transmission block size (TBS);

the priority level of a scheduled service;

a process index of a current data, i.e., different process indices can be configured so that device A may transmit multiple data in a manner which does not require transmission of a data started only after initial transmission and re-transmission of a previous data are completed;

source identity (SID). Information included in an SA may be used for determining a DMRS sequence and a scrambling code of a data channel, so as to randomize interference. Since adjacent devices may use the same MCS and priority, or the like, interference cannot be sufficiently randomized. By including SID in the SA for determining DMRS sequence and scrambling code of a data channel, better randomization can be achieved. SID may refer to the identity of the device that sent the current SA, e.g., when a data is transmitted multiple times, the SID indicates the multiple transmissions are from the same device. The meaning of the SID may not be limited to the identity of the device that transmits the current SA. For example, the SID may also indicate the relation between data, i.e., multiple data are from the same device, and the SID is the identity of a group of data from the same source device. The SID which indicates a group of data from the same source device may be used together with the above process index to specify multiple data transmitted by device A. Or, data corresponding to different process indices may be allocated with different SIDs, therefore the above process indices may not be transmitted. Or, one SID may identify multiple transmissions/re-transmissions of only one data, i.e., one SID is the identity of one data. When one SID identifies one data, the above process index may not be transmitted.

The SID may be unique within a certain range, thus can uniquely identify a device. Since devices may be moving in a high speed, two devices having the same SID may not affect communication of each other when they are far from each other within a time period. But after a time period, the two devices may become close to each other, thus adjacent devices may make mistakes as to which of the two devices is the source of a message. When the two devices are close enough to each other to receive the SA from each other, the two devices may detect that an adjacent device uses the same SID, i.e., an SID collision happens.

From the perspective of device A, the SID of device A may be selected by device A. A group of SIDs may be configured or pre-configured for device A, so that device A may only select an SID from the group of SIDs. Or, instead of configuring the group of SIDs, device A may select an SID from all of SIDs. The information of SID groups may be configured when the resource pool is configured. The resource pool may be an SA resource pool, or a resource pool of data channels. Denote the set of SIDs to be S. When determining an SID for the first time, device A may select an SID from the left SIDs which are obtained by excluding from all of SIDs the SIDs occupied by other devices according to detected SAs, e.g., randomly select one of the left SIDs, and use the selected SID is the identity of device A. Or, device A may have its SID configured by a base station.

As shown in FIG. 8, device A may continuously sensing whether there is an SID collision (as shown in step 801) when receiving SAs of other devices. If there is no SID collision, device A may continue using its SID (802), and change the SID when certain condition(s) is met. Other conditions which may result in changing the SID are not limited in the present disclosure. When an SID collision happens, step 803 may be executed to change the SID of the device.

When a first device finds a second device uses the same SID with the first device based on a received SA, the first device determines an SID collision is detected. Or, when a first device finds a second device uses the same SID with the first device based on a received SID and the received power of the second device exceeds a threshold, the first device determines an SID collision is detected. The above received power may be the received power of the SA of the second device, or may be the received power of a DMRS of a data channel scheduled by the SA of the second device. The threshold may be a pre-determined value or a value configured by higher layer. In addition, from the perspective of a receiving device, other parameters, e.g., MCS, the number of PRBs, process index, the priority level of service, or the like, may also serve as the basis for differentiating different data, thus the receiving device will not combine data with different control information. As such, when a first device detects an SA sent by a second device uses the same SID with the first device, the first device may further analyze one or multiple of the other parameters, and determines an SID collision is detected only when the other parameters are also the same. As such, when a first device detects an SA sent by a second device uses the same SID with the first device, the first device may further analyze one or multiple of the other parameters, and determines an SID collision is detected only when the other parameters are also the same. The following is a method of processing SID confusion according to the present disclosure.

When the SID of device A is selected by device A, after detecting an SID collision, device A may re-select another SID. Denote the set of SIDs to be S. Device A may select an SID from the left SIDs which are obtained by excluding from all of SIDs the SIDs occupied by other devices according to detected SAs, e.g., randomly select one of the left SIDs, and use the selected SID is the new identity of device A. When the SID of device A is configured by a base station, after detecting an SID collision, device A may report the event of SID collision to the base station to request the base station to configure a new SID. When data transmitted by a device includes information such as another identity of the device or the like, the SID of the device may not have to remain unchanged in a long time.

According to a method of resource selection/re-selection based on SA sensing and received power, if device A process resource occupancy after subframe n only based on the received power in the last cyclic period in the sensing window, it is allowed that the SID of device A may be different in different cyclic periods. As such, device A may perform sensing after transmission of each data, and perform SID re-selection after detecting an SID collision.

Or, device A may perform sensing after continuous transmission of X data, and perform SID re-selection after detecting an SID collision. The X may be a value which is pre-determined, configured by higher layer, or determined dynamically. For example, when the received power of transmission of a device in multiple cyclic periods in a sensing window can be used for determining resource occupancy of the device after subframe n, there is the need of identifying transmission of the same device in multiple cyclic periods, and the SID of a device may be unchanged in the multiple cyclic periods. The above sensing may be performed during resource selection/re-selection, i.e., the sensing and the resource re-selection are performed simultaneously. After detecting the SID collision, SID re-selection is performed, and the re-selected SID is continuously used until the next resource re-selection. The method ensures all data transmissions of device A on the same resource use the same SID between two resource re-selections, which facilitates receiving devices identifying transmissions from device A and measuring received power based on all data transmissions on the same resource. Or, since the length of a sensing window is 1s, the interval between changes of SID is controlled to be larger than is to ensure data transmissions from the same device within a sensing window are identified by the same SID.

In order to avoid confusion resulted from SID collision, when device A receives multiple data transmissions identified by the same SID and other information of SAs scheduling the data transmissions can be distinguished from each other, e.g., the data transmissions have different process IDs, TBSs, or the like, device A may measure received power based on a resource that can be identified as corresponding to transmissions of the same data. For example, when a resource scheduled by an SA is not the resource reserved by another SA, two data with the same SID and different MCSs may be from different devices, thus received power measured on resources scheduled by SAs with different MCSs cannot be jointly processed. Or, after identifying other identities in received data using higher layer processing, device A may further calculate the average value of measured values of multiple data transmissions from the same device.

When an SA identifies all of K resources occupied by the device, i.e., a receiving device may jointly receive data according to the above resource identification information, an SID may not be transmitted if resource occupancy after subframe n is processed only based on the measured value of the received power in the last cyclic period in the sensing window. If resource occupancy after subframe n is processed not only based on the measured value of the received power in the last cyclic period in the sensing window, an SID may be transmitted and the SID may stays the same in multiple cyclic periods, so that transmissions in the multiple cyclic periods can be identified to be from the same device. Or, when an SA further identifies the number of cyclic periods in which the K resources are to be occupied, after receiving an SA, device A may obtain information about data transmissions from the same device in multiple continuous cyclic periods, and determine resource occupancy based on measurements of the data transmissions. In such cases, the SID may also not be transmitted, and the receiving device may identify the device using another identity in information sent in the data channel. Considering that the SID may also be used for obtaining the DMRS sequence of a data channel, if the SID is not transmitted, another data field may be added in the SA for identifying the DMRS sequence, or the DMRS sequence may be randomized based on other existing information.

EMBODIMENT FOUR

In an example, device A selects resources in a selecting window $[n+T_1, n+T_2]$. $T_1$ and $T_2$ are decided by implementation of UE, e.g., $T_1 \leq 4$ and $20 \leq T_2 \leq 100$. $T_1$ is influenced by processing delay from the UE selects resources to the UE starts transmitting SA and data, and $T_2$ is mainly related with delay characteristics tolerable by the current service. A resource is in a subframe and occupies one or multiple continuous sub-channels. One sub-channel includes one or multiple continuous PRBs. According to the method as shown in FIG. 4, there may be two schemes to assist device A performing resource selection/re-selection in subframe n.

A first scheme is a method of processing resource occupancy of another device after subframe n based on SA. That is, SA of another device B is corrected received in a sensing window, the received power of device B is measured according to scheduling information of the SA to obtain a reference value of the received power of the another device after subframe n. When the reference value of the received power is larger than the threshold Th1_R, a determination is made that the resource is not available.

A second scheme is a method of processing resource occupancy of another device after subframe n based on the total received energy received in each subframe/sub-band in a sensing window. Device A may obtain a reference value of the total received energy in a subframe/sub-band after subframe n based on a measurement value of the total received energy in the sensing window and certain known or configured information about resource occupancy periods, compare resources based on the reference value of the total received energy to identify a certain portion of resources with smaller reference value of received energy and select the resource to be used randomly from the identified resources.

As shown in FIG. 9, according to the method of FIG. 4, device A may sense system load (901) when performing resource selection/re-selection based on a sensing result obtained in a sensing window. The system load is simply referred to in the following as load. If the current load is not heavy (i.e., the current load is smaller than or equal to a pre-determined value), the device may carry out regular resource selection/re-selection (902), i.e., performing resource selection/re-selection according to the two collision avoidance schemes based on the received power and the total received energy. If the current system load is heavy (i.e., the current load is larger than the pre-determined value), i.e., after taking the two collision avoidance schemes based on the received power and the total received energy, no or only a few resources is available to device A, the system is close to or in a congested state, there is a need of a method to solve the congestion problem and reduce interference to ensure data transmission performances (903).

Because there are two collision avoidance schemes, loads in the two collision avoidance schemes may be respectively defined. The load may be defined as, when one of the schemes is considered, i.e., only considering the received power or the total received energy of a channel scheduled by a correctly received SA, the ratio of the number of unavailable resources to the total number of resources. For example, when S subframes and N PRBs are observed, the number of unavailable PRBs in the S subframes is B, the load may be defined as B/(S·N). Or, when S subframes are observed, each subframe is divided into N sub-channels, the number of unavailable sub-channels in the S subframes is B, the load may be defined as B/(S·N). Or, for the scheme based on SA and received power, the load may be defined as the average value of the received power on unavailable resources. Correspondingly, for the scheme based on the total received energy, the load may be defined as the average value of the total received energy on unavailable resources. When loads are defined respectively for the two schemes, it may be defined that when the loads under the two schemes are both larger than respective thresholds, a determination is made that the system load is heavy. Or, it may be defined that when the load of any of the two schemes is larger than the corresponding threshold, it may be determined that the system load is heavy. Or, the weighted average value of the loads of the two schemes may be compared with a threshold to judge whether the system load is heavy.

The load may also be defined as, when the two schemes are jointly considered, the ratio of the number of unavailable resources to the total number of resources. Or, the load may be defined as, after the two schemes are considered, the average value of the total received energy on the currently unavailable resources. Or, the load may be defined as the average value of the total received energy on all of resources.

According to the above definitions of the load, device A may judge whether a resource is available based on the measurement value of the actual received power and/or the measurement value of the actual total received energy on the source, and use the judgment result in calculating the load. According to the method, the load may be obtained by measuring the resources in the sensing window corresponding to subframe n. Or, the load may be calculated based on the measurement value of the resources in a time period T. The length of T may be larger than or smaller than the length of the sensing window. In addition, the load may be a long term average value, e.g., may be defined as the moving average value of the measurement values of the load at various time points. For example, the ratio of the number of unavailable resources to the total number of resources may be measured in each time period of a length of T0, denoting the i'th measurement value is $R_i$, the load value may be updated to be $L(i)=c \cdot L(i-1)+(1-c) \cdot R_i$, c is a pre-defined value or a value configured by higher layer, or a value that is dynamically adjustable, $L(i-1)$ is the load obtained in the previous calculation of device A.

If a device is detected to transmit data on the resource based on SA sensing, the received power of the device is measured. When the received power is larger than a threshold Th1, a determination is made that the resource is unavailable. The above threshold Th1 may be the same with or different from the threshold Th1_R used in the method of processing resource occupancy of another device after subframe n based on SA sensing. Th1 is a pre-defined value, or a value configured by higher layer, or a dynamically adjustable value. Or, Th1=Th1_R+Δ' Δ is a pre-defined value, or a value configured by higher layer, or a dynamically adjustable value. In addition, the total received energy on the resource may be measured. When the total received energy is larger than a threshold Th2, a determination is made that the resource is unavailable. Th2 is a pre-defined value, or a value configured by higher layer, or a dynamically adjustable value.

According to the above definitions of the load, device A may judge whether a resource is available based on the measurement value of the received power and/or the measurement value of the total received energy on the source in the sensing window, and use the judgment result in calculating the load. According to the method, the load may be calculated using predicted resource occupancy information in a selecting window after subframe n. The length of the selecting window may equal the product of the cyclic period of device A and the number of cyclic periods in which the resource is continuously occupied. Or, the length of the selecting window may equal a cyclic period of device A. Or, the selecting window may be a selecting window [n+$T_1$, n+$T_2$]. In addition, the load may be a long term average value, e.g., may be defined as the moving average value of the measurement values of the load at various time points. For example, the ratio of the number of unavailable resources to the total number of resources in the selecting window of the i'th prediction may be $R_i$, the load value may be updated to be $L(i)=c \cdot L(i-1)+(1-c) \cdot R_i$, c is a pre-defined value or a value configured by higher layer, or a value that is dynamically adjustable, $L(i-1)$ is the load obtained in the previous calculation of device A. The prediction of the ratio of the number of unavailable resources to the total number of resources in the selecting window may be performed only when resource selection/re-selection is to be performed, or may be performed at certain intervals.

According to the above method of processing resource occupancy of another device after subframe n based on SA sensing, when the reference value of the received power of a resource after subframe n is larger than a threshold Th1, the resource is determined to be unavailable in the calculation of the load. The above threshold Th1 may be the same with or different from the threshold Th1_R used in the method of processing resource occupancy of another device after subframe n based on SA sensing. Th1 is a pre-defined value, or a value configured by higher layer, or a dynamically adjustable value. Or, Th1=Th1_R+Δ' Δ is a pre-defined value, or a value configured by higher layer, or a dynamically adjustable value. According to the above method of processing resource occupancy of another device after subframe n based on the total received energy, when the reference value of the total received energy of a resource after subframe n is larger than a threshold Th2, the resource is determined to be unavailable in the calculation of the load. Th2 is a pre-defined value, or a value configured by higher layer, or a dynamically adjustable value.

Further, device A actually occupies resources according to a cyclic period of P, and K resources are allocated for each cyclic period and are occupied in C continuous cyclic periods, i.e., only when the remaining available resources conform to a certain pattern, i.e., are available in C continuous cyclic periods with each cyclic period is P, the resources are actually available to device A. Therefore, when defining the load, the pattern of resources actually available to device A in the remaining resources may be analyzed after performing the above two collision avoidance schemes, and the load may be defined as 1−B/A. B is the number of available resource patterns, A is the total number of resource patterns. When judging whether a resource is available, C may be a pre-defined value, or a value configured by higher layer, or a dynamically standardized value, e.g., a device may randomly generate the number of cyclic periods in which a resource is to be occupied. Or, according to the above, the resource patterns actually available to device A in the remaining resources may be analyzed, a resource which does not belong to any of the available resource patterns is determined to be unavailable. Thus, the load may still be defined as the ratio of the number of currently unavailable resources to the total number of resources. As for the above near-congested or congested state, some methods may be used to reduce inter-device interferences, thus increase the number of available resources.

After detecting the system load is relatively heavy, device A may reduce the transmitting power to reduce interference to adjacent devices after selecting certain resource(s). When devices in an area all reduce respective transmitting power after resource re-selection, the load and interference in the area may be reduced. The method may take the influence of system load into consideration when the transmitting power of device A is determined.

The above device A may reduce the time-frequency resources occupied by device A after detecting the system load is relatively heavy. For example, the number of PRBs occupied in a subframe may be reduced, or the number of subframes occupied in a cyclic period may be reduced, i.e., the number of transmissions of the same data. When devices in an area all reduce respective occupied time-frequency resources after resource re-selection, the load and interference in the area may be reduced. According to the method, device A may adjust the number of PRBs occupied for transmission and/or the number of transmissions of a data according to the system load.

In the SA sensing-based scheme, the threshold may be increased to increase the probability of the received power of device A does not exceed the above threshold. The above threshold may be related with the transmitting power of device A, e.g., when the transmitting power of device A is reduced, the above threshold may be increased accordingly to obtain more available resources while restricting interference to other devices.

In the above SA-based collision avoidance scheme, the threshold may be related with one or multiple parameters, e.g., the load, the average value of received power, the average value of total received energy, or the like. The device may adjust the threshold according to one or multiple of the parameters. Or, the device may send a report to a base station to report the measurement value of one or multiple of the above parameters, so that the base station may adjust the threshold and send configuration signaling to the device.

In the above method of processing resource occupancy of another device after subframe n based on SA sensing, after a sub-band of a subframe x after subframe n is determined to be unavailable, the same sub-band in all of subframes $x+k \cdot P_A$ may be excluded, i.e., all of the subframes/sub-bands are not used in the current resource selection/re-selection of device A. $P_A$ is the cyclic period in which device A is to occupy the resource, and k is an integer. In fact, the above methods are sometimes too conservative in excluding resources. When resource selection/re-selection of device A is to occupy resources in C cyclic periods, after a sub-band of a subframe x after subframe n is determined to be unavailable, the same sub-band in all of subframes $x+k \cdot P_A$ may be excluded only when the above resource x is within the C cyclic periods. That is, when $x-C \cdot P_A \geq n+y$, y is the minimum delay between a selected subframe and subframe n when resource selection/re-selection is performed in subframe n, the influence of unavailable resources of the subframe x on resource selection/re-selection of device A may not be taken into consideration. This method may be used only in situations where the load is relatively heavy, or may be used in all of situations where resource selection/re-selection is performed.

In the above near-congested or congested state, device A is allowed to occupy some of unavailable resources for data transmission. The above unavailable resource may refer to resources judged to be unavailable and already occupied by another device according to the above two collision avoidance schemes. In order to control inter-device interference, in the above method, the ratio of the unavailable resources to resources occupied by device A is controlled to be smaller than a threshold. The threshold may be a pre-defined value, or a value configured by higher layer, or a dynamically adjustable value.

In the near-congested or congested state, when device A needs to occupy K resources in a cyclic period, the number of resources which satisfy the occupy requirement may be smaller than K. Further, there may be a resource that cannot be occupied in at least $P_{min}$ continuous cyclic periods. In this situation, some compromised methods may be used. A first processing method is, when there is not enough available resources, device A selects a resource and occupies the resource in a smaller number of cyclic periods, i.e., the number of cyclic periods in which device A occupies K resources is smaller than $P_{min}$. A second processing method is, when resource selection/min re-selection is performed respectively for each of the K resources, the subframe/sub-band of each resource and the number of cyclic periods in which the resource is repetitively occupied may be determined, and different resources may be occupied in different number of cyclic periods which may be smaller than $P_{min}$. A third processing method is, device A selects multiple resources, and the resources may have different cyclic periods. The resources are used in such a manner that there are K resources in each service period of device A. The timing of resource selection/re-selection is still common, and the number of cyclic periods in which a resource is occupied may be smaller than $P_{min}$. As shown in FIG. 10, when device A is to occupy two resources according to a cyclic period of P and cannot find two resources that satisfy requirements, device A may select three resources, in which resources 1001~1004 satisfy the requirement of being occupied according to cyclic period P, resources 1011 and 1012 have a period of 2P and are only occupied in the first period and the third period, and resources 1021 and 1022 have a period of 2P and are only occupied in the second period and the fourth period. By using the above resources, there are still two available resources in each cyclic period of P. A fourth processing method is, device A still periodically occupy some of the K resources. As to the other resources of the K resources, the device may dynamically determine in each cyclic period the subframe/sub-band occupied by the resources, and accordingly, specify the other resources are released in the next cyclic period in SA(s) scheduling the other resources.

EXAMPLE FIVE

In a V2X system, a device may send a synchronization channel in some specific subframes, i.e., a primary sidelink synchronization signal (PSSS) and a secondary sidelink synchronization signal (SSSS), and some broadcast control information, i.e., physical sidelink broadcast channel (PSBCH). The above synchronization channel and the broadcast channel may be mapped to the same PRB in the same subframe, and are denoted by synchronization channel/broadcast channel. A data channel of a periodic service occupies resources according to a cyclic period, which may result in the data channel and the above synchronization channel/broadcast channel in the same cyclic period may be mapped to the same subframe, and the data channel and the above synchronization channel/broadcast channel are in different subframes in other cyclic periods. For example, when a device occupies resources according to a cyclic period of 100 ms, and occupies resources of K subframes in each cyclic period, supposing the cyclic period of the above synchronization channel/broadcast channel is 200 ms, in a cyclic period, one of the K resources of the device may be within the same subframe with the synchronization channel/broadcast channel. When the above collision happens, the interval of occurrence of the collision is 200 ms. When a data channel of device A is mapped onto a subframe where the synchronization channel/broadcast channel locates, a processing method may be determined according to whether device A needs to send the synchronization channel/broadcast channel.

When device A needs to send the synchronization channel/broadcast channel, if the data channel is allocated with a PRB different from the PRB of the synchronization channel/broadcast channel and device A has enough transmitting power, device A may send both the synchronization channel/broadcast channel and the data channel in the subframe. If device A has limited power, power required by the synchronization channel/broadcast channel may be first guaranteed, and remaining power may be used for sending the data channel. Or, only the synchronization channel/broadcast channel is sent, and the data channel may be discarded. Or, because there are many devices in the system and those devices whose data channel is not in conflict with the synchronization channel/broadcast channel have already sent respective synchronization channel/broadcast channel, when device A has limited power, device A may first guarantee the power for transmitting the data channel, and use remaining power for transmitting the synchronization channel/broadcast channel. Or, only the data channel is sent, and the synchronization channel/broadcast channel may be discarded.

When device A needs to send the synchronization channel/broadcast channel, if the PRB of the data channel overlaps or partially overlaps with the PRB of the synchronization channel/broadcast channel and device A has enough transmitting power, device A may first transmit the synchronization channel/broadcast channel, and transmit data in the portion of PRB of the data channel which is not occupied by the synchronization channel/broadcast channel. If device A has limited power, power required by the synchronization channel/broadcast channel may be first guaranteed, and remaining power may be used for sending the data channel. Or, device A may only send the synchronization channel/broadcast channel, and discard the data channel. Or, because there are many devices in the system and those devices whose data channel is not in conflict with the synchronization channel/broadcast channel have already sent respective synchronization channel/broadcast channel, device A may send the data channel in the PRB of the data channel that is not occupied by the synchronization channel/broadcast channel, and not transmit the synchronization channel/broadcast channel.

When device A does not need to send the synchronization channel/broadcast channel, if the data channel is allocated with a PRB different from that of the synchronization channel/broadcast channel, device A may send the data channel. Or, when the PRB of the data channel overlaps or partially overlaps with the PRB of the synchronization channel/broadcast channel, device A may send the data channel in the PRB of the data channel that has not been occupied by the synchronization channel/broadcast channel.

When the data channel and the synchronization channel/broadcast channel are mapped to the same subframe, device A may transmit the data channel only in a portion of PRBs, or not transmit the data channel at all. In this situation, device A may still send the SA scheduling the data channel to increase the probability the SA is received by a receiving device. Thus, the receiving device may obtain information on the resources occupied by device A and on whether the resource occupied by device A is released or is to be occupied in some more cyclic periods, or the like. The receiving device may make preparations for subsequent reception of data channel or for the sensing of received power based on the SA. According to the above methods, a receiving device may obtain the relation between the data channel and the synchronization channel/broadcast channel of device A, thereby obtain the data channel processing method of device A, i.e., does not transmit data, transmit data in only some of PRBs or transmit data in all of PRBs of the data channel, and thus be able to correctly process the data channel.

When the subframe occupied by an SA is determined, the subframe in which the current synchronization channel/broadcast channel is to be transmitted may be avoided to be used to avoid the device simultaneously transmits different channels, maintain the single-carrier characteristics, thus is good for guaranteeing coverage and save power. Or, when the PRBs occupied by the SA and the synchronization channel/broadcast channel are not overlapped with each other, the SA may be allowed to be transmitted in a subframe in which the synchronization channel/broadcast channel is transmitted. Such transmission harms the single-carrier characteristics and is not beneficial to uplink transmission performances, thus should be avoided if possible.

In a V2X system, devices may be divided into multiple types, e.g., vehicles, pedestrians, road side units (RSUs), and the like. Devices of different types may use different methods to process data channels and synchronization channels/broadcast channels. For some devices that do not have power restrictions, e.g., vehicles, RSUs, or the like, these devices may transmit data and the synchronization channel/broadcast channel at the same time. For some other devices that have power restrictions, e.g., pedestrians, RSUs powered by a battery, or the like, these devices may not transmit the synchronization channel/broadcast channel while transmitting data, or may transmit the synchronization channel/broadcast channel according to a relatively longer cyclic period (e.g., longer than 200 ms). For example, the transmitting period of the synchronization channel/broadcast channel may be the same with the service period, i.e., when the service period of a pedestrian is 1000 ms, the period of the synchronization channel/broadcast channel of the pedestrian may also be 1000 ms, and the distance between the subframe of the synchronization channel/broadcast channel and the subframe of PSSCH may be smaller than a threshold, e.g., 100 ms, to save power.

Corresponding to the above method, the present disclosure also provides a device. As shown in FIG. 11, the device includes a sensing module, a resource selecting module, and a sending and receiving module.

The sensing module is configured to sense scheduling assignment (SA) and the received power of another device, and/or total received energy of all of subframes or sub-bands of the device.

The resource selecting module is configured to perform resource selection/re-selection according to a sensing result of the sensing module.

The sending and receiving module is configured to receive an SA and a data channel from another device, and transmit an SA and a data channel of the device according to channel resources selected/re-selected.

Those skilled in the art can understand that some or all of the steps of the methods provided by the embodiments may be implemented by hardware controlled by software programs. The software programs may be stored in a computer-readable storage medium. The software may implement any or any combination of the procedures of the methods when executed.

The modules of various examples may be integrated into one processing module, or may be standalone physical units. Or, two or multiple of the above modules may be integrated into one module. The integrated module may be implemented by hardware or software modules. The integrated module may also be stored in a computer-readable storage medium when implemented by software modules and sold and used as an individual product.

The storage medium may be read-only storage medium, magnetic disks or compact disks, or the like.

The scope of the claims should not be limited by the embodiments set forth in the examples, but should be given the broadest interpretation consistent with the description as a whole.

The invention claimed is:

1. A data transmission method, comprising,
sensing, by a first device, scheduling assignment (SA) and received power corresponding to another device, and/or a total of received energy of all of subframes or sub-bands of the first device;
selecting or re-selecting, by the first device, K resources as resources occupied by the first device based on a sensing result, wherein K is greater than or equal to 1; and
transmitting, by the first device, data using the selected resources,
wherein, in case that the selecting or re-selecting of the K resources is performed in subframe n, selecting or re-selecting of the K resources further comprises at least one of:
determining K data channel resources based on a sensing result obtained from a sensing window corresponding to subframe n; and
determining a data channel resource according to each sensing window corresponding to each resource of the K resources, based on a sensing result of each sensing window.

2. The method of claim 1, wherein selecting the K resources as the resources occupied by the first device comprises:
performing a selecting or re-selecting process for all of the K resources; or
performing a selecting or re-selecting process for each of the resources; or
assigning the K resources into a plurality of groups, and performing a selecting or re-selecting process for each of the groups.

3. The method of claim 1, wherein selecting or re-selecting by the first device resources according to a sensing result comprises:
performing the sensing in a sensing window only before the timing of resource re-selected, and performing the selecting or re-selecting according to a sensing result; or
sensing subframes within a sensing window before a prospective resource re-selection time point so that the proportion of subframes measured within the sensing window is larger than the proportion of subframes measured before the sensing window.

4. The method of claim 3, wherein when a subframe in a selecting window has an index of m,
the first device senses a subframe whose index is $m-P_q$, $P_q \in Q$ or $P_q \in Q$ and $P_q \geq P_w$, Q is a set of resource reserve cyclic periods, $P_w$ is a reference value of reservation interval; or
the first device senses a subframe whose index is m−p, $p \in Q'$, Q' is a superset which includes the set Q, or Q' is a superset which includes all of elements $P_q$ of Q, and $P_q \geq P_w$.

5. The method of claim 3, wherein
when there is a j which makes $y+j \cdot P_A = m+P_q$, wherein $P_q \in Q$, m is an index of a subframe on which no sensing operation is performed in the sensing window, a single-subframe resource $R_{x,y}$ is unavailable to the first device; or when there is a j which makes $y+j \cdot P_A = m+P_q$, $P_q \in Q$ and $P_q \geq P_w$, the single-subframe resource $R_{x,y}$ is unavailable to the first device; $R_{x,y}$ is on subframe y and includes one or multiple consecutive sub-bands starting from sub-band x, $P_q$ is a resource reserve cyclic period, Q is a set of resource reserve cyclic periods, $P_w$ is a reference value of reservation interval, j is an integer smaller than C but not smaller than 0, C is the number of periods in which device A is to reserve resource according to the cyclic period $P_A$; or
when there is a j which makes $y+j \cdot P_A = m+P_q$, wherein $P_q \in Q$, m is an index of a subframe on which no sensing operation is performed in a sub window of a reservation interval $P_q$ which is available for data transmission, the single-subframe resource $R_{x,y}$ is unavailable to the first device; or when there is a j which makes $y+j \cdot P_A = m+P_q$, $P_q \in Q$ and $P_q \geq P_w$, the single-subframe resource $R_{x,y}$ is unavailable to the first device; or
when there is a j which makes $y+j \cdot P_A = m+P_q$, wherein $P_q \in Q$, m is an index of a subframe on which no sensing operation is performed in a sub window on which a sensing operation is performed, the single-subframe resource $R_{x,y}$ is unavailable to the first device; or when there is a j which makes $y+j \cdot P_A = m+P_q$, $P_q \in Q$ and $P_q \geq P_w$, the single-subframe resource $R_{x,y}$ is unavailable to the first device; or
no processing is applied to a subframe on which no sensing operation is performed.

6. The method of claim 4, wherein for a set Q', when an index of a subframe in the selecting window is m, and device A performs no sensing operation on a subframe whose index is m−p, p∉Q', there does not exist a j which makes y+j·$P_A$=m−p+$P_q$ for a single-subframe resource $R_{x,y}$, wherein $P_q$∈Q, j is an integer smaller than C but not smaller than 0, C is the number of periods in which device A is to reserve resource according to the cyclic period $P_A$.

7. The method of claim 1, wherein selecting or re-selecting by the first device resources according to a sensing result comprises:

when resource selection or re-selection is performed within subframe n and the first device does not perform the sensing of SA and received power and the sensing of the total received energy of all of subframes/sub-bands of the first device before the subframe n, performing, by the first device, resource selection or re-selection and reducing the time of repetitively occupying the resources; and/or when resource selection or re-selection is performed within subframe n and the first device does not perform the sensing of SA and received power and the sensing of the total received energy of all of subframes/sub-bands of the first device before the subframe n, performing, by the first device, resource re-selection after detecting resource collision.

8. The method of claim 7, wherein performing by the first device resource re-selection after detecting resource collision comprises any one of:

after detecting resource collision, performing, by the first device, the resource re-selection after performing data transmission of a cyclic period;

after detecting resource collision, performing, by the first device, the resource re-selection after performing data transmission of a cyclic period and indicating resource release in at least one SA;

after detecting resource collision, performing, by the first device, the resource re-selection after indicating resource release in all of SAs within a cyclic period and after the cyclic period ends;

performing, by the first device, resource selection or re-selection respectively for each resource, and performing resource re-selection for a resource in which resource collision is detected;

performing, by the first device, resource selection or re-selection respectively for each resource, and performing resource re-selection after transmitting SA indicating resource release in response to detection of resource collision;

dividing, by the first device, the resources into groups, performing resource selection or re-selection for each of the groups of resources, and performing resource re-selection only for a group of resources in which collision is detected after the collision is detected.

9. A data transmission device, comprising:

a transceiver; and a controller configured to:

sense scheduling assignment (SA) and received power corresponding to another device, and/or total received energy of all of subframes or sub-bands of the data transmission device;

perform selection or re-selection of K resources as resources occupied by a first device, based on a sensing result, wherein K is greater than or equal to 1; and transmit, via the transceiver, data using selected resources;

wherein, in case that the selecting or re-selecting of the K resources is performed in subframe n, the controller is further configured to at least one of:

determine K data channel resources based on a sensing result obtained from a sensing window corresponding to subframe n; and determine a data channel resource according to each sensing window corresponding to each resource of the K resources, based on a sensing result of each sensing window.

10. The method of claim 5, wherein for a set Q', when an index of a subframe in the selecting window is m, and device A performs no sensing operation on a subframe whose index is m−p, p∉Q', there does not exist a j which makes y+j·$P_A$=m−p+$P_q$ for a single-subframe resource $R_{x,y}$, wherein $P_q$∈Q, j is an integer smaller than C but not smaller than 0, C is the number of periods in which device A is to reserve resource according to the cyclic period $P_A$.

* * * * *